US012573158B2

(12) United States Patent
Oberemk et al.

(10) Patent No.: US 12,573,158 B2
(45) Date of Patent: Mar. 10, 2026

(54) DISPLAYING A RECIPE PREPARATION SUGGESTION IN AN AUGMENTED REALITY ELEMENT BASED ON A PREDICTED RECIPE BEING PREPARED

(71) Applicant: Maplebear Inc., San Francisco, CA (US)

(72) Inventors: Mark Oberemk, Toronto (CA); Shaun Navin Maharaj, Vaughan (CA); Brent Scheibelhut, Toronto (CA)

(73) Assignee: Maplebear Inc., San Francisco, CA (US)

( * ) Notice: Subject to any disclaimer, the term of this patent is extended or adjusted under 35 U.S.C. 154(b) by 134 days.

(21) Appl. No.: 18/753,880

(22) Filed: Jun. 25, 2024

(65) Prior Publication Data

US 2025/0391124 A1 Dec. 25, 2025

(51) Int. Cl.
*G06T 19/00* (2011.01)
*G06V 40/20* (2022.01)

(52) U.S. Cl.
CPC ............ *G06T 19/006* (2013.01); *G06V 40/20* (2022.01); *G06V 2201/07* (2022.01)

(58) Field of Classification Search
CPC ... G06T 19/006; G06V 40/20; G06V 2201/07
See application file for complete search history.

(56) References Cited

U.S. PATENT DOCUMENTS 9,824,152 B1 * 11/2017 Feller .................. G06F 16/9535
2024/0257542 A1 * 8/2024 Jeong .................. H04N 23/667

FOREIGN PATENT DOCUMENTS

CN 117581182 A * 2/2024 .............. G06F 3/011

* cited by examiner

*Primary Examiner* — Chante E Harrison
(74) *Attorney, Agent, or Firm* — Fenwick & West LLP

(57) ABSTRACT

A client device, or an online system communicating with the device, receives video data depicting a field of view of a display area of the device and applies machine-learning algorithms to the video data to detect objects, including portions of a body of a user of the device, within the field of view and to determine a series of body poses. The device/system uses machine-learning models to predict an action performed by the user based on the series of poses and to predict a recipe being prepared based on the objects and a predicted series of actions performed by the user. The device/system selects a suggestion associated with preparing the recipe based on candidate suggestions associated with preparing the recipe, the objects, or the predicted series of actions, and generates an augmented reality element describing the suggestion. The augmented reality element is displayed in the display area of the device.

20 Claims, 10 Drawing Sheets

DISPLAYING A RECIPE PREPARATION SUGGESTION IN AN AUGMENTED REALITY ELEMENT BASED ON A PREDICTED RECIPE BEING PREPARED

BACKGROUND

Due to the increasing popularity of augmented reality (AR) and mixed reality (MR) devices, users of the devices may find them more convenient to use than other personal or mobile computing devices (e.g., smartphones, tablets, etc.), especially while performing tasks that require the use of one or both hands, such as preparing recipes. For example, suppose that a user of augmented reality glasses is using an AR cooking application while preparing a recipe. In this example, the user may view ingredients and a set of instructions for preparing the recipe while wearing the device without having to use their hands to interact with a touchscreen, a mouse, etc.

However, users of AR and MR devices may still have difficulty preparing recipes while using the devices. In the above example, to make the recipe, the user may have to make gestures or use voice commands to search for information describing an instruction with which they are unfamiliar, to view the next step of the recipe, etc. Additionally, in the above example, if the user realizes while making the recipe that they are missing an ingredient or do not have enough of an ingredient, they may have to search for substitutions for the ingredient, a different recipe to prepare, etc. Furthermore, in the above example, if the user is not performing a step of the recipe in the most efficient way (e.g., chopping an ingredient using proper form with a proper knife), the user may have no way of knowing this and will be unable to make improvements. Moreover, in the above example, if the user is preparing a recipe that calls for a one-pound steak, but the user has a two-pound steak, the user may undercook the steak if they follow the instructions for the cooking time and temperature stated in the recipe or they may overcook the steak if they overcompensate for the difference in the weight of the steak by increasing the cooking time or temperature by too much.

SUMMARY

In accordance with one or more aspects of the disclosure, a recipe preparation suggestion is displayed in an augmented reality element based on a predicted recipe being prepared. More specifically, a client device, or an online system communicating with the client device, receives video data captured by a camera of the client device, in which the video data depicts a field of view of a display area of the client device. The client device/online system applies one or more machine-learning algorithms to the video data to detect one or more objects within the field of view, in which the object(s) include one or more portions of a body of a user associated with the client device. For each of multiple timeframes of the video data, the client device/online system applies one or more machine-learning algorithms to determine a series of poses of the portion(s) of the body of the user and accesses and applies a first machine-learning model to predict an action being performed by the user based on the series of poses. The client device/online system accesses and applies a second machine-learning model to predict a recipe being prepared by the user based on a predicted series of actions being performed by the user during the timeframes and the object(s). The client device/online system retrieves recipe data for the recipe, in which the recipe data includes a set of candidate suggestions associated with preparing the recipe. The client device/online system selects one or more suggestions associated with preparing the recipe based on the set of candidate suggestions, the object(s), or the predicted series of actions and generates an augmented reality element including information describing the suggestion(s). The augmented reality element is then displayed in the display area of the client device.

DETAILED DESCRIPTION

Figure 1:
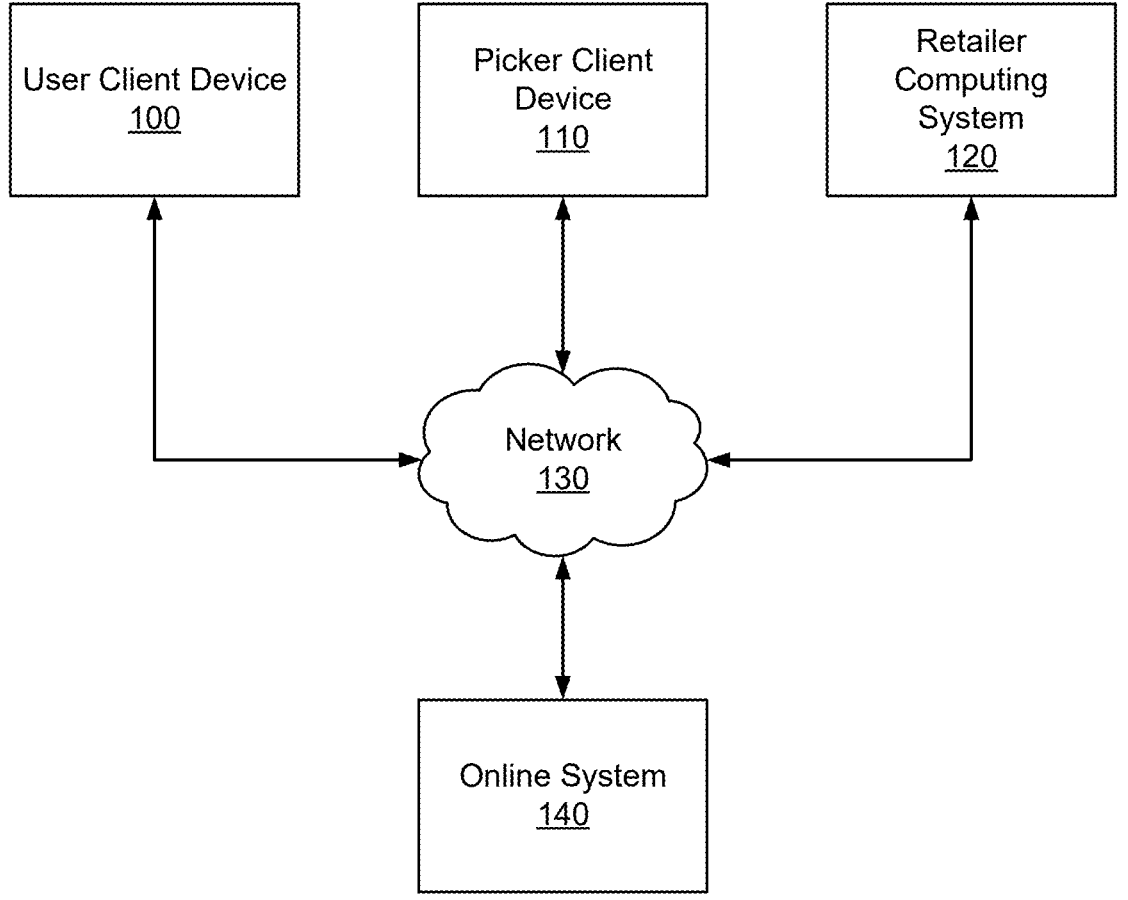
FIG. 1 illustrates an example system environment for an online system and a user client device, in accordance with one or more embodiments.

FIG. 1 illustrates an example system environment for an online system and a user client device, in accordance with one or more embodiments. The system environment illustrated in FIG. 1 includes a user client device 100, a picker client device 110, a retailer computing system 120, a network 130, and an online system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Although one user client device 100, picker client device 110, and retailer computing system 120 are illustrated in FIG. 1, any number of users, pickers, and retailers may interact with the online system 140. As such, there may be more than one user client device 100, picker client device 110, or retailer computing system 120.

The user client device 100 is a client device through which a user may interact with the picker client device 110, the retailer computing system 120, or the online system 140. The user client device 100 may be a personal or mobile computing device, such as a smartphone, a tablet, a laptop computer, or a desktop computer. The user client device 100 also may be an augmented reality (AR) device or a mixed reality (MR) device that integrates digital elements (e.g., visual, audio, haptic, etc.) with a user's environment in real time. The user client device 100 also may be a personal or mobile computing device having the capabilities of an AR or MR device. In some embodiments, the user client device 100 executes a client application that uses an application programming interface (API) to communicate with the online system 140.

A user uses the user client device 100 to place an order with the online system 140. An order specifies a set of items to be delivered to the user. An "item," as used herein, refers to a good or product that may be provided to the user through the online system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The user client device 100 presents an ordering interface to the user. The ordering interface is a user interface that the user may use to place an order with the online system 140. The ordering interface may be part of a client application operating on the user client device 100. The ordering interface allows the user to search for items that are available through the online system 140 and the user may select which items to add to a "shopping list." A "shopping list," as used herein, is a tentative set of items that the user has selected for an order but that has not yet been finalized for an order. The ordering interface allows a user to update the shopping list, e.g., by changing the quantity of items, adding or removing items, or adding instructions for items that specify how the items should be collected.

The user client device 100 may receive additional content from the online system 140 to present to a user. For example, the user client device 100 may receive coupons, recipes, or item suggestions. The user client device 100 may present the received additional content to the user as the user uses user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online system 140. In addition to text messages, the communication interfaces of the user client device 100 and the picker client device 110 may allow the user and the picker to communicate through audio or video communications, such as a phone call, a voice-over-IP call, or a video call. The user client device 100 is described in further detail below with regards to FIG. 2B.

The picker client device 110 is a client device through which a picker may interact with the user client device 100, the retailer computing system 120, or the online system 140. The picker client device 110 may be a personal or mobile computing device, such as a smartphone, a tablet, a laptop computer, or a desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a retailer location. The picker client device 110 presents the items that are included in the user's order to the picker in a collection interface. The collection interface is a user interface that provides information to the picker identifying items to collect for a user's order and the quantities of the items. In some embodiments, the collection interface provides multiple orders from multiple users for the picker to service at the same time from the same retailer location. The collection interface further presents instructions that the user may have included related to the collection of items in the order. Additionally, the collection interface may present a location of each item at the retailer location, and may even specify a sequence in which the picker should collect the items for improved efficiency in collecting items. In some embodiments, the picker client device 110 transmits to the online system 140 or the user client device 100 which items the picker has collected in real time as the picker collects the items.

The picker may use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 provides instructions to a picker for delivering the items for a user's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the user client device 100 for display to the user, so that the user can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online system 140. Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a user from a retailer location.

The retailer computing system 120 is a computing system operated by a retailer that interacts with the online system 140. As used herein, a "retailer" is an entity that operates a "retailer location," which is a store, a warehouse, a building, or other location from which a picker can collect items or from which a user may order or purchase items. The retailer computing system 120 stores and provides item data to the online system 140 and may regularly update the online system 140 with updated item data. For example, the retailer computing system 120 provides item data indicating which items are available at a particular retailer location and the quantities of those items. Additionally, the retailer computing system 120 may transmit updated item data to the online system 140 when an item is no longer available at the retailer location. Furthermore, the retailer computing system 120 may provide the online system 140 with updated item prices, sales, or availabilities. Additionally, the retailer computing system 120 may receive payment information from the online system 140 for orders serviced by the online system 140. Alternatively, the retailer computing system 120 may provide payment to the online system 140 for some portion of the overall cost of a user's order (e.g., as a commission).

The user client device 100, the picker client device 110, the retailer computing system 120, and the online system 140 may communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 may be an online concierge system by which users can order items to be provided to them by a picker from a retailer. The online system 140 receives orders from a user client device 100 through the network 130. The online system 140 selects a picker to service the user's order and transmits the order to a picker client device 110 associated with the picker. The picker collects the ordered items from a retailer location and delivers the ordered items to the user. The online system 140 may charge a user for the order and provide portions of the payment from the user to the picker and the retailer. As an example, the online system 140 may allow a user to order groceries from a grocery store retailer. The user's order may specify which groceries they want delivered from the grocery store and the quantities of each of the groceries. The user's client device 100 transmits the user's order to the online system 140 and the online system 140 selects a picker to travel to the grocery store retailer location to collect the groceries ordered by the user. Once the picker has collected the groceries ordered by the user, the picker delivers the groceries to a location transmitted to the picker client device 110 by the online system 140. The online system 140 is described in further detail below with regards to FIG. 2A.

Figure 2A:
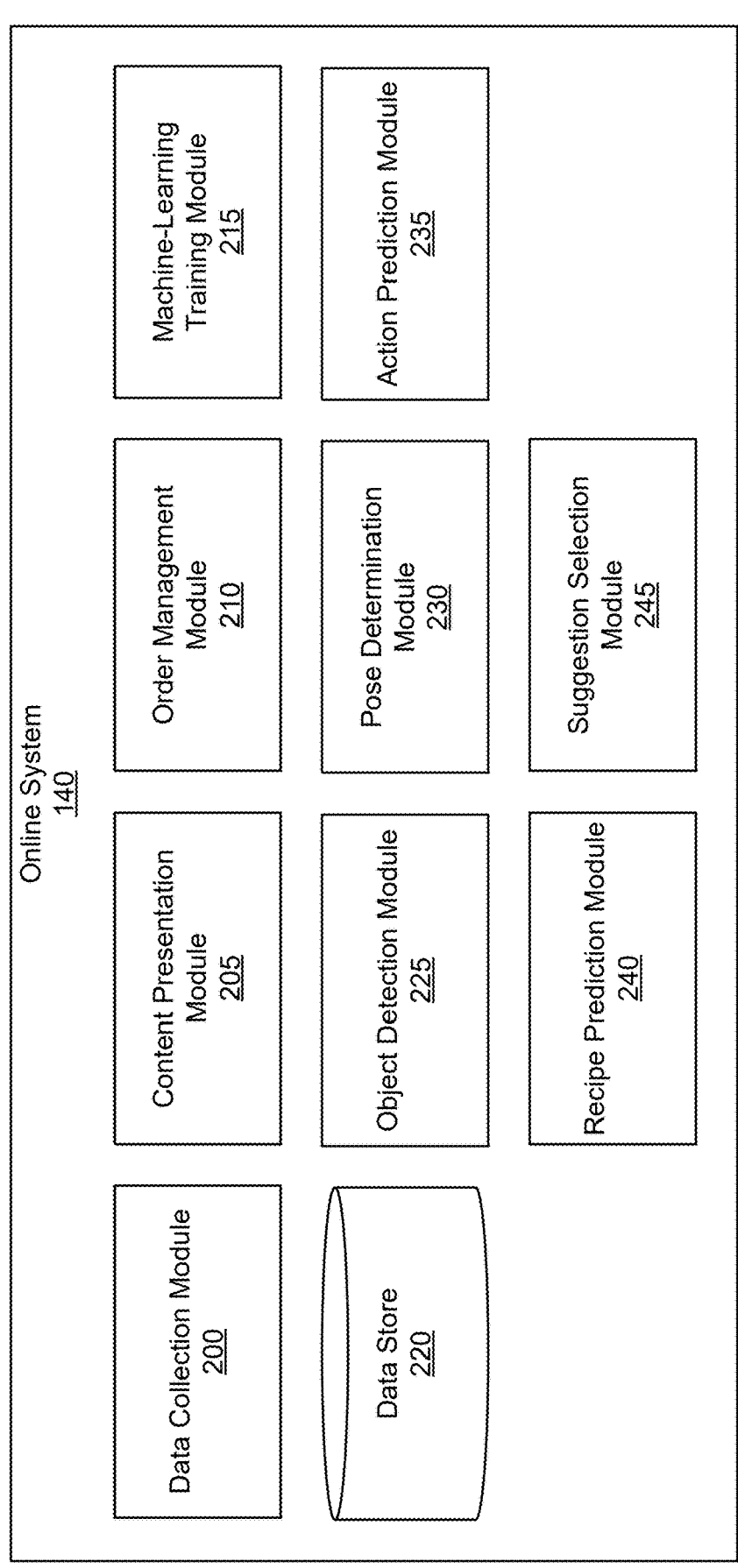
FIG. 2A illustrates an example system architecture for an online system, in accordance with one or more embodiments.

FIG. 2A illustrates an example system architecture for an online system, in accordance with some embodiments. The system architecture illustrated in FIG. 2A includes a data collection module 200, a content presentation module 205, an order management module 210, a machine-learning training module 215, a data store 220, an object detection module 225, a pose determination module 230, an action prediction module 235, a recipe prediction module 240, and a suggestion selection module 245. Alternative embodiments may include more, fewer, or different components from those illustrated in FIG. 2A, and the functionality of each component may be divided between the components differently from the description below. Additionally, each component may perform their respective functionalities in response to a request from a human, or automatically without human intervention.

The data collection module 200 collects data used by the online system 140 and stores the data in the data store 220. The data collection module 200 may only collect data describing a user if the user has previously explicitly consented to the online system 140 collecting data describing the user. Additionally, the data collection module 200 may encrypt all data, including sensitive or personal data, describing users.

The data collection module 200 collects user data, which is information or data describing characteristics of a user. User data may include a user's name, address, preferences, such as shopping preferences or dietary preferences or restrictions (e.g., vegetarian, gluten-free etc.), favorite items, recipes, or cuisines, or stored payment instruments. The user data also may include default settings established by the user, such as a default retailer/retailer location, payment instrument, delivery location, or delivery timeframe. The user data also may include historical information associated with a user. For example, the user data may include historical conversion information, such as historical order information describing previous orders placed by a user with the online system 140 or historical purchase information describing previous purchases made by the user from one or more retailer locations, items included in each order/purchase, a date of each order/purchase, etc. As an additional example, the user data may include historical interaction information describing previous interactions by a user with recipes, such as recipes the user viewed, recipes for which the user searched, recipes the user saved, recipes the user indicated they prepared, recipes the user rated, etc.

User data also may include additional types of information. The user data also may include information describing one or more objects associated with a user. For example, the user data may include information describing objects in a user's kitchen, such as a refrigerator, an oven, a hand mixer, a blender, milk, eggs, flour, sugar, etc. Information describing one or more objects associated with a user may be stored in association with a time at which the object(s) was/were detected by the object detection module 225, as described below. The user data also may include information describing a measure of deviation of an action performed by a user from a technique for performing the action. For example, the user data may include a value (e.g., a score or a percentage) describing an amount by which an action performed by a user deviates from a technique for dicing onions or poaching eggs. Information describing a measure of deviation of an action performed by a user from a technique for performing the action may be stored in association with a time at which the measure of deviation was predicted by the suggestion selection module 245, as described below. The data collection module 200 may collect the user data from sensors on the user client device 100 or based on the user's interactions with the online system 140. The data collection module 200 also may collect the user data from a retailer computing system 120 or from various components (e.g., the object detection module 225 or the action prediction module 235) of the online system 140 or the user client device 100.

The data collection module 200 also collects item data, which is information or data identifying and describing items that are available at a retailer location. The item data may include item identifiers for items that are available and may include quantities of items associated with each item identifier. Additionally, item data may also include attributes of items such as the sizes, colors, weights, stock keeping units (SKUs), serial numbers, prices, item categories, brands, qualities (e.g., freshness, ripeness, etc.), ingredients, materials, manufacturing locations, versions/varieties (e.g., flavors, low fat, gluten-free, organic, etc.), availabilities/ seasonalities, or any other suitable attributes of the items. The item data may further include purchasing rules associated with each item, if they exist. For example, age-restricted items such as alcohol and tobacco are flagged accordingly in the item data. Item data may also include information that is useful for predicting the availability of items at retailer locations. For example, for each item-retailer combination (a particular item at a particular retailer location), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or a user client device 100.

An item category is a set of items that are a similar type of item. Items in an item category may be considered to be equivalent to each other or may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects picker data, which is information or data describing characteristics of pickers. For example, the picker data for a picker may include the picker's name, the picker's location, how often the picker has serviced orders for the online system 140, a user rating for the picker, the retailers from which the picker has collected items, or the picker's previous shopping history. Additionally, the picker data may include preferences expressed by the picker, such as their preferred retailers for collecting items, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects conversion data, which is information or data describing characteristics of an order or a purchase. For example, conversion data may include item data for items that are included in an order, a delivery location for the order, a user associated with the order, a retailer location from which the user wants the ordered items collected, or a timeframe within which the user wants the order delivered. As an additional example, conversion data may include item data for items that are included in a purchase, user data for a user who made the purchase, and information describing the purchase (e.g., a retailer location from which the user purchased the items and a date and time of the purchase). Conversion data may further include information describing how an order was serviced, such as which picker serviced the order, when the order was delivered, or a rating that the user gave the delivery of the order. Conversion data may also include user data for users associated with orders or purchases, such as user data for a user who placed an order or picker data for a picker who serviced the order. Conversion data further may include information or data describing characteristics of one or more additional types of conversions, such as searching for a recipe, saving a recipe, adding an item to a shopping list, etc.

The data collection module 200 also may collect recipe data, which is information or data describing characteristics of a recipe. Recipe data for a recipe may include information that may be used to identify the recipe, such as a name of the recipe, an author of the recipe, a date the recipe was created, one or more images or videos associated with the recipe, etc. Recipe data for a recipe also may include a set of objects associated with preparing the recipe, such as a set of ingredients of the recipe (e.g., information describing each ingredient, an amount or a quantity of each ingredient, etc.) or a set of tools (e.g., aluminum foil, a rolling pin, a food processor, etc.) used to prepare the recipe. Recipe data for a recipe also may include a set of instructions for preparing the recipe, a series of actions associated with preparing the recipe, a set of techniques associated with preparing the recipe, or an amount of time required to prepare the recipe. A "technique," as used herein, refers to a standard way of performing an action (e.g., using proper form, proper tools, etc.). Additionally, recipe data for a recipe also may include a set of nutritional information associated with the recipe, a number of servings the recipe yields, a cuisine (e.g., American, Thai, Italian, etc.) associated with the recipe, or a meal (e.g., brunch, dessert, etc.) associated with the recipe. Furthermore, recipe data for a recipe may include a set of candidate suggestions associated with preparing the recipe. A set of candidate suggestions associated with a recipe may include a guide for preparing the recipe (e.g., step-by-step instructions for preparing the recipe), information describing a technique associated with preparing the recipe, or any other suitable types of information associated with preparing the recipe. Recipe data for a recipe also may include statistics associated with the recipe, such as a number of users who viewed, saved, or prepared the recipe, a user rating for the recipe, etc., or any other suitable types of information. Furthermore, recipe data may include text data, image data, video data, audio data, or any other suitable types of data.

A technique associated with preparing a recipe may be described by or associated with various types of information. For example, a technique for chopping onions may be described by one or more videos of professional chefs demonstrating the technique. In the above example, the technique also or alternatively may be described by one or more crowdsourced videos received from user client devices 100 (e.g., augmented reality devices) depicting users demonstrating the technique. In some embodiments, a technique is associated with a skill level (e.g., beginner, intermediate, or expert). Furthermore, in some embodiments, multiple techniques are associated with performing the same action. For example, suppose that recipe data for a recipe corresponding to an omelet includes three techniques for flipping an omelet. In this example, a technique associated with a beginner skill level may demonstrate how to flip an omelet using a plate, a technique associated with an intermediate skill level may demonstrate how to flip an omelet using a spatula, and a technique associated with an expert skill level may demonstrate how to flip an omelet by flipping a pan in an upward direction. Additionally, a technique associated with preparing a recipe may be associated with one or more tools used for the technique. For example, a technique for filleting a fish may be associated with a tool corresponding to a filleting knife.

In some embodiments, the data collection module 200 maintains recipe data in a recipe graph. The recipe graph may identify connections between recipes stored in the data store 220. A connection between a recipe and another recipe may indicate that the connected recipes share one or more attributes. For example, a connection between a recipe and another recipe may indicate that the recipes share one or more ingredients, use one or more common tools or techniques, etc. In some embodiments, a connection between a recipe and another recipe indicates that the connected recipes were paired together by a user (e.g., as a main dish and as a side dish) or were prepared by a user within a threshold amount of time from each other. In various embodiments, a connection between recipes includes a value indicating a strength of a connection between the recipes. For example, a connection between recipes may indicate a frequency with which the recipes are prepared together, a measure of similarity between their ingredients, etc. The data collection module 200 may collect recipe data from a user client device 100, a third-party system (e.g., a website or an application), or any other suitable source.

The data collection module 200 also may collect action data, which is information or data describing characteristics of an action performed by a user. Action data for an action may include video data depicting a user performing the action or information describing one or more objects associated with the action. For example, action data for an action corresponding to chopping an onion may include video data depicting a user chopping an onion and information describing objects corresponding to a type of knife used by the user and an onion. Action data for an action also may include information describing a technique for performing the action. In the above example, the action data also may include a video demonstrating a technique for chopping the onion. Action data for an action also may include information describing a measure of deviation of the action from a technique for performing the action, which may be human-generated or predicted by the suggestion selection module 245, as described below. Continuing with the above example, the action data further may include a value (e.g., a score or a percentage) describing an amount by which the action performed by the user deviates from the technique demonstrated in the video. The data collection module 200 may collect action data from a user client device 100, a third-party system (e.g., a website or an application), a component (e.g., the suggestion selection module 245) of the online system 140 or the user client device 100, or any other suitable source.

In some embodiments, the data collection module 200 also may derive information from other data stored in the data store 220 and then store this derived information in the data store 220 (e.g., in association with the data from which it was derived). For example, if a set of user data for a user describes recipes previously prepared by the user, the data collection module 200 may derive a frequency with which the user prepares each recipe or a number or percentage of recipes the user prepares that include an ingredient or are associated with a cuisine. Continuing with this example, the data collection module 200 also may derive information indicating that the user has a preference for a recipe if the user prepares the recipe with at least a threshold frequency or that the user has a preference for a particular ingredient or cuisine if at least a threshold number or percentage of recipes the user prepares include the ingredient or are associated with the cuisine. In the above example, the data collection module 200 also may derive information indicating that the user has access to a tool or is familiar with a technique if the user prepared at least a threshold number or percentage of recipes using the tool or technique. As an additional example, suppose that a set of user data for a user describes orders previously placed by the user including eggs and the data collection module 200 derives information from the user data indicating that the user orders one dozen eggs once a week. In this example, if the user's most recent purchase of one dozen eggs was made half a week ago, the data collection module 200 may derive information indicating the user likely has half a dozen eggs. Alternatively, in the above example, if the set of user data for the user indicates that a recipe most recently made by the user was made a few hours ago and called for two eggs and that prior to making the recipe, the object detection module 225 detected seven eggs in the user's refrigerator. In this example, the data collection module 200 may derive information indicating the user likely has five eggs.

The content presentation module 205 selects content for presentation to a user. For example, the content presentation module 205 selects which items to present to a user while the user is placing an order. The content presentation module 205 generates and transmits an ordering interface for the user to order items. The content presentation module 205 populates the ordering interface with items that the user may select for adding to their order. In some embodiments, the content presentation module 205 presents a catalog of all items that are available to the user, which the user can browse to select items to order. The content presentation module 205 also may identify items that the user is most likely to order and present those items to the user. For example, the content presentation module 205 may score items and rank the items based on their scores. In this example, the content presentation module 205 then displays the items with scores that exceed some threshold (e.g., the top n items or the p percentile of items).

The content presentation module 205 may use an item selection model to score items for presentation to a user. An item selection model is a machine-learning model that is trained to score items for a user based on item data for the items and user data for the user. For example, the item selection model may be trained to determine a likelihood that the user will order an item. In some embodiments, the item selection model uses item embeddings describing items and user embeddings describing users to score items. These item embeddings and user embeddings may be generated by separate machine-learning models and may be stored in the data store 220.

In some embodiments, the content presentation module 205 scores items based on a search query received from the user client device 100. A search query is free text for a word or set of words that indicate items of interest to the user. The content presentation module 205 scores items based on a relatedness of the items to the search query. For example, the content presentation module 205 may apply natural language processing (NLP) techniques to the text in the search query to generate a search query representation (e.g., an embedding) that represents characteristics of the search query. The content presentation module 205 may use the search query representation to score candidate items for presentation to a user (e.g., by comparing a search query embedding to an item embedding).

In some embodiments, the content presentation module 205 scores items based on a predicted availability of an item. The content presentation module 205 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 205 may apply a weight to the score for an item based on the predicted availability of the item. Alternatively, the content presentation module 205 may filter out items from presentation to a user based on whether the predicted availability of the item exceeds a threshold.

The content presentation module 205 also may generate one or more augmented reality elements. Information included in an augmented reality element may be communicated via various means (e.g., text data, image data, video data, audio data, etc.). For example, the content presentation module 205 may generate an augmented reality element including text, one or more images, or one or more videos. In this example, the text, image(s), or video(s) also may be described by or accompanied by an audio component, haptic feedback, etc. The content presentation module 205 also may update an augmented reality element with different or additional information (e.g., upon receiving information from a user to whom the augmented reality element is presented).

In some embodiments, an augmented reality element generated by the content presentation module 205 includes a prompt to confirm a user is preparing a recipe predicted by the recipe prediction module 240 (described below). For example, suppose that the recipe prediction module 240 predicts a user is preparing a recipe for beef stew. In this example, the content presentation module 205 may generate an augmented reality element including a prompt asking the user to confirm the user is preparing the recipe. In some embodiments, the prompt may be communicated to the user via other means (e.g., spoken instructions asking the user to confirm whether they are preparing the recipe).

Additionally, the content presentation module 205 may generate an augmented reality element based on one or more suggestions associated with preparing a recipe. The suggestion(s) may be selected by the suggestion selection module 245, as described below. A suggestion associated with preparing a recipe may include a guide for preparing the recipe, information describing a technique associated with preparing the recipe, information describing one or more recipes a user may prepare (e.g., one or more additional recipes if the user does not have an ingredient of the recipe or a tool used to prepare the recipe), or any other suitable types of information. In embodiments in which an augmented reality element generated by the content presentation module 205 includes information describing one or more recipes a user may prepare, the content presentation module 205 may generate the augmented reality element in response to receiving a request from a user client device 100 associated with the user to suggest the recipe(s).

In embodiments in which an augmented reality element generated by the content presentation module 205 includes a guide for preparing a recipe, the guide may correspond to a set of step-by-step instructions for preparing the recipe. For example, the content presentation module 205 may generate an augmented reality element that includes a video describing a step included in a set of step-by-step instructions for preparing a recipe. In this example, once the action prediction module 235 predicts an action associated with the step has been completed, as described below, the content presentation module 205 may generate an additional augmented reality element or update the augmented reality element. In the above example, the additional/updated augmented reality element may include a video describing a subsequent step of the set of step-by-step instructions or it may indicate the step has been completed (e.g., based on an amount of time elapsed since a user began performing the step). In some embodiments, the content presentation module 205 generates an augmented reality element including a set of step-by-step instructions for preparing a recipe in response to receiving information confirming a user is preparing the recipe.

In some embodiments, an augmented reality element generated by the content presentation module 205 includes content to encourage user engagement. Examples of such types of information include: information describing a user's progress with respect to a technique, gamification elements (e.g., badges, points, challenges, etc.), or any other suitable types of content. For example, if user data for a user describes a predicted measure of deviation of an action performed by the user from a technique for chopping onions predicted on various dates, in which the predicted measure of deviation has decreased over the past year, the content presentation module 205 may generate an augmented reality element that includes information describing the user's improvement. In the above example, based on the user's improvement, the user may earn points towards a badge associated with the technique (e.g., a beginner, an intermediate, or an expert onion chopping badge). In the above example, if the user has earned enough points for the badge, the augmented reality element also or alternatively may include information describing a challenge that would allow the user to earn additional points (e.g., trying a more advanced technique for chopping onions).

An augmented reality element generated by the content presentation module 205 may include one or more interactive elements. A user may interact with an interactive element to select an option associated with the augmented reality element (e.g., to prepare a recipe, to place an order, to view additional information associated with a recipe, to respond to a prompt, etc.). For example, if an augmented reality element includes a prompt to confirm a user is preparing a recipe for beef stew, the augmented reality element may include text, an image, or a video describing the recipe, as well as interactive elements corresponding to a button that allows the user to confirm they are preparing the recipe and another button that allows the user to indicate they are not preparing the recipe. As an additional example, suppose that an augmented reality element generated by the content presentation module 205 includes a suggestion to place an order including one or more ingredients of a recipe a user is preparing that the user does not have and information describing additional recipes that the user may prepare based on ingredients and tools the user has. In this example, the augmented reality element also may include buttons with which the user may interact to place the order, to select an additional recipe to prepare, or to view additional information associated with an additional recipe (e.g., nutritional information, an amount of time required to prepare the additional recipe, etc.).

Once the content presentation module 205 generates or updates an augmented reality element, the augmented reality element may be displayed in a display area of a user client device 100. For example, the content presentation module 205 may send an augmented reality element to the user client device 100, causing the user client device 100 to display the augmented reality element. In this example, the augmented reality element may be displayed in a display screen of the user client device 100 if the user client device 100 is a smartphone or a tablet or in one or more lenses of the user client device 100 if the user client device 100 is a pair of augmented reality glasses. The augmented reality element may be overlaid onto a portion of the display area of the user client device 100 based on a location of an object detected by the object detection module 225 within the field of view of the display area, as described below. For example, an augmented reality element may be overlaid onto a portion of a display area of a user client device 100 other than a location at which each hand of a user of the user client device 100 is detected (e.g., outside of a bounding box that identifies the location), such that the augmented reality element does not obstruct the user's view of their hands.

The content presentation module 205 also may receive various types of information from a user associated with a user client device 100. Examples of such types of information include: a selection of an option associated with an augmented reality element, a response to a prompt communicated to the user client device 100, a request (e.g., to suggest recipes for the user to prepare, to accept a challenge, etc.), or any other suitable types of information. The content presentation module 205 may receive the information via one or more gestures made by the user, one or more voice commands received from the user, by tracking the eyes of the user, via a physical controller associated with the user client device 100 or a touch screen of the user client device 100, etc. Furthermore, in embodiments in which an augmented reality element displayed in a display area of the user client device 100 includes one or more interactive elements, the content presentation module 205 may receive the information via an interaction with an interactive element. For example, the content presentation module 205 may receive a selection of an option included in an augmented reality element when the user interacts with a button included in the augmented reality element corresponding to the option (e.g., via a gesture, by clicking on the button, etc.).

The order management module 210 manages orders for items from users. The order management module 210 receives orders from user client devices 100 and assigns the orders to pickers for service based on picker data. For example, the order management module 210 assigns an order to a picker based on the picker's location and the retailer location from which the ordered items are to be collected. The order management module 210 may also assign an order to a picker based on how many items are in the order, a vehicle operated by the picker, the delivery location, the picker's preferences for how far to travel to deliver an order, the picker's ratings by users, or how often the picker agrees to service an order.

In some embodiments, the order management module 210 determines when to assign an order to a picker based on a delivery timeframe requested by the user who placed the order. The order management module 210 computes an estimated amount of time that it would take for a picker to collect the items for an order and deliver the ordered items to the delivery location for the order. The order management module 210 assigns the order to a picker at a time such that, if the picker immediately services the order, the picker is likely to deliver the order at a time within the requested timeframe. Thus, when the order management module 210 receives an order, the order management module 210 may delay in assigning the order to a picker if the requested timeframe is far enough in the future (i.e., the picker may be assigned at a later time and is still predicted to meet the requested timeframe).

When the order management module 210 assigns an order to a picker, the order management module 210 transmits the order to the picker client device 110 associated with the picker. The order management module 210 may also transmit navigation instructions from the picker's current location to the retailer location associated with the order. If the order includes items to collect from multiple retailer locations, the order management module 210 identifies the retailer locations to the picker and may also specify a sequence in which the picker should visit the retailer locations.

The order management module 210 may track the location of the picker through the picker client device 110 to determine when the picker arrives at the retailer location. When the picker arrives at the retailer location, the order management module 210 transmits the order to the picker client device 110 for display to the picker. As the picker uses the picker client device 110 to collect items at the retailer location, the order management module 210 receives item identifiers for items that the picker has collected for the order. In some embodiments, the order management module 210 receives images of items from the picker client device 110 and applies computer-vision techniques to the images to identify the items depicted by the images. The order management module 210 may track the progress of the picker as the picker collects items for an order and may transmit progress updates to the user client device 100 that describe which items have been collected for the user's order.

In some embodiments, the order management module 210 tracks the location of the picker within the retailer location. The order management module 210 uses sensor data from the picker client device 110 or from sensors in the retailer location to determine the location of the picker in the retailer location. The order management module 210 may transmit, to the picker client device 110, instructions to display a map of the retailer location indicating where in the retailer location the picker is located. Additionally, the order management module 210 may instruct the picker client device 110 to display the locations of items for the picker to collect, and may further display navigation instructions for how the picker can travel from their current location to the location of a next item to collect for an order.

The order management module 210 determines when the picker has collected all of the items for an order. For example, the order management module 210 may receive a message from the picker client device 110 indicating that all of the items for an order have been collected. Alternatively, the order management module 210 may receive item identifiers for items collected by the picker and determine when all of the items in an order have been collected. When the order management module 210 determines that the picker has completed an order, the order management module 210 transmits the delivery location for the order to the picker client device 110. The order management module 210 may also transmit navigation instructions to the picker client device 110 that specify how to travel from the retailer location to the delivery location, or to a subsequent retailer location for further item collection. The order management module 210 tracks the location of the picker as the picker travels to the delivery location for an order, and updates the user with the location of the picker so that the user can track the progress of the order. In some embodiments, the order management module 210 computes an estimated time of arrival of the picker at the delivery location and provides the estimated time of arrival to the user.

In some embodiments, the order management module 210 facilitates communication between the user client device 100 and the picker client device 110. As noted above, a user may use a user client device 100 to send a message to the picker client device 110. The order management module 210 receives the message from the user client device 100 and transmits the message to the picker client device 110 for presentation to the picker. The picker may use the picker client device 110 to send a message to the user client device 100 in a similar manner.

The order management module 210 coordinates payment by the user for the order. The order management module 210 uses payment information provided by the user (e.g., a credit card number or a bank account) to receive payment for the order. In some embodiments, the order management module 210 stores the payment information for use in subsequent orders by the user. The order management module 210 computes a total cost for the order and charges the user that cost. The order management module 210 may provide a portion of the total cost to the picker for servicing the order, and another portion of the total cost to the retailer.

The machine-learning training module 215 trains machine-learning models used by the online system 140. The online system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model is used by the machine-learning model to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 215 generates the set of parameters (e.g., the particular values of the parameters) for a machine-learning model by "training" the machine-learning model. Once trained, the machine-learning model uses the set of parameters to transform inputs into outputs.

The machine-learning training module 215 trains a machine-learning model based on a set of training examples. Each training example includes input data to which the machine-learning model is applied to generate an output. For example, each training example may include user data, picker data, item data, conversion data, action data, or recipe data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

In embodiments in which the recipe prediction module 240 accesses and applies a recipe prediction model to predict a recipe being prepared by a user, as described below, the machine-learning training module 215 may train the recipe prediction model. The machine-learning training module 215 may train the recipe prediction model via supervised learning or using any other suitable technique or combination of techniques based on various types of data stored in the data store 220 or any other suitable types of data. For example, the machine-learning training module 215 may train the recipe prediction model based on recipe data and user data stored in the data store 220. To illustrate an example of how the machine-learning training module 215 may train the recipe prediction model, suppose that the machine-learning training module 215 receives a set of training examples including various attributes of recipes. In this example, the set of training examples may describe a series of actions and a set of objects (e.g., ingredients or tools) associated with preparing each recipe. Continuing with this example, the set of training examples also may include attributes of users performing the series of actions, such as historical order, purchase, or interaction information associated with each user, each user's favorite items, recipes, or cuisines, each user's dietary preferences, etc. In the above example, the machine-learning training module 215 also may receive labels which represent expected outputs of the recipe prediction model, in which a label identifies or describes a corresponding recipe being prepared (e.g., a name, an author, a date of creation, one or more images or videos, etc. associated with the recipe). Continuing with this example, the machine-learning training module 215 may then train the recipe prediction model based on the attributes, as well as the labels by comparing its output from input data of each training example to the label for the training example.

In embodiments in which the suggestion selection module 245 accesses and applies a deviation prediction model to predict a measure of deviation of an action being performed by a user from a technique, as described below, the machine-learning training module 215 may train the deviation prediction model. The machine-learning training module 215 may train the deviation prediction model via supervised learning or using any other suitable technique or combination of techniques based on various types of data stored in the data store 220 or any other suitable types of data. For example, the machine-learning training module 215 may train the deviation prediction model based on action data stored in the data store 220. To illustrate an example of how the machine-learning training module 215 may train the deviation prediction model, suppose that the machine-learning training module 215 receives a set of training examples including videos depicting users performing actions associated with a technique. In the above example, the machine-learning training module 215 also may receive labels which represent expected outputs of the deviation prediction model, in which a label describes a measure of deviation of a corresponding action from the technique. Continuing with this example, the machine-learning training module 215 may then train the deviation prediction model based on the videos, as well as the labels by comparing its output from input data of each training example to the label for the training example.

The machine-learning training module 215 may apply an iterative process to train a machine-learning model whereby the machine-learning training module 215 updates parameter values of the machine-learning model based on each of the set of training examples. The training examples may be processed together, individually, or in batches. To train a machine-learning model based on a training example, the machine-learning training module 215 applies the machine-learning model to the input data in the training example to generate an output based on a current set of parameter values. The machine-learning training module 215 scores the output from the machine-learning model using a loss function. A loss function is a function that generates a score for the output of the machine-learning model such that the score is higher when the machine-learning model performs poorly and lower when the machine-learning model performs well. In situations in which the training example includes a label, the loss function is also based on the label for the training example. Some example loss functions include the mean square error function, the mean absolute error, the hinge loss function, and the cross-entropy loss function. The machine-learning training module 215 updates the set of parameters for the machine-learning model based on the score generated by the loss function. For example, the machine-learning training module 215 may apply gradient descent to update the set of parameters.

In one or more embodiments, the machine-learning training module 215 may retrain the machine-learning model based on the actual performance of the model after the online system 140 has deployed the model to provide service to users. For example, if the machine-learning model is used to predict a likelihood of an outcome of an event, the online system 140 may log the prediction and an observation of the actual outcome of the event. Alternatively, if the machine-learning model is used to classify an object, the online system 140 may log the classification as well as a label indicating a correct classification of the object (e.g., following a human labeler or other inferred indication of the correct classification). After sufficient additional training data has been acquired, the machine-learning training module 215 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online system 140 as a whole in its performance of the tasks described herein.

The data store 220 stores data used by the online system 140. For example, the data store 220 stores user data, item data, conversion data, picker data, action data, and recipe data for use by the online system 140. The data store 220 also stores trained machine-learning models trained by the machine-learning training module 215. For example, the data store 220 may store the set of parameters for a trained machine-learning model on one or more non-transitory, computer-readable media. The data store 220 uses computer-readable media to store data, and may use databases to organize the stored data.

The object detection module 225 receives video data captured by a camera of a user client device 100, in which the video data depicts a field of view of a display area of the user client device 100. As described above, a user client device 100 may be an augmented reality (AR) device or a mixed reality (MR) device that integrates digital elements (e.g., visual, audio, haptic, etc.) with a user's environment in real time, or a personal or mobile computing device having the capabilities of an AR or MR device. For example, suppose that a user client device 100 is an AR device, such as a pair of augmented reality glasses. In this example, the object detection module 225 receives video data captured by a camera of the augmented reality glasses.

The object detection module 225 also detects one or more objects within a field of view of a display area of a user client device 100 based on video data captured by a camera of the user client device 100. The object detection module 225 may detect the object(s) by applying one or more machine-learning algorithms to the video data, in which the algorithm(s) detect the object(s) based on shapes, colors, patterns, etc. depicted in the video data. Examples of such types of algorithms include: single-shot detector (SSD), you only look once (YOLO), region-based convolutional neural networks (R-CNN), optical character recognition (OCR), natural language processing (NLP), or any other suitable algorithm or combination of algorithms.

When detecting an object, the object detection module 225 may determine a class to which the object belongs, as well as a location of the object within video data depicting a field of view of a display area of a user client device 100. A class may correspond to an ingredient of a recipe, a tool (e.g., a knife, a frying pan, etc.) used to prepare a recipe, a portion of a body of a user associated with a user client device 100 (e.g., one or more fingers, hands, arms, etc. of the user), or any other suitable type of object (e.g., a refrigerator, a cabinet door, a pantry, etc.). For example, the object detection module 225 may apply one or more machine-learning algorithms to video data, in which the machine-learning algorithm(s) classify objects depicted in the video data, such as a hand, an onion, and a knife (e.g., using a multiclass classifier). In the above example, the machine-learning algorithm(s) also may determine coordinates of a bounding box that identifies the location of each object within the video data. Additionally, once the object detection module 225 detects an object, the object detection module 225 may track the movement of the object or portions of the object (e.g., by tracking coordinates of a bounding box that identifies its location). In the above example, the object detection module 225 may track the movement of the hand as it chops the onion. In this example, once the onion is chopped, the object detection module 225 also may track the movement of pieces of the chopped onion.

When detecting an object, the object detection module 225 also may detect one or more attributes of the object. Examples of attributes of an object include: a quantity, a dimension, a size, an amount, a quality (e.g., freshness, ripeness, etc.), a version/variety (e.g., a flavor, low fat, gluten-free, organic, etc.), a state (e.g., boiling, simmering, baking, chopped, minced, scrambled, etc.), a setting (e.g., a speed, a temperature, etc.), or any other suitable attribute of the object. In the above example, the object detection module 225 also may detect an amount (e.g., one cup) of the chopped onion based on the size of the onion before it was chopped relative to the size of another object detected by the object detection module 225 that is a standard size (e.g., a 10.75 ounce can of soup). In the above example, the object detection module 225 also may detect a type of the knife (e.g., bread knife, cleaver, chef's knife, paring knife, boning knife, etc.).

Once the object detection module 225 detects an object, the object detection module 225 may store information describing the object (e.g., a class of the object, a location of the object, one or more attributes of the object, etc.) in the data store 220. The information describing the object may be stored in association with various types of information. Examples of such types of information include: a time at which it was detected, information describing a user associated with a user client device 100 that captured video data in which it was detected, a location of the object when it was detected (e.g., in a kitchen, a refrigerator, etc.), or any other suitable types of information.

Once the object detection module 225 detects one or more objects corresponding to one or more portions of a body of a user associated with a user client device 100, the pose determination module 230 may determine a series of poses of the portion(s) of the body of the user. The pose determination module 230 may do so by applying one or more machine-learning algorithms to each of multiple timeframes of video data captured by a camera of the user client device 100. The machine-learning algorithms may include pose estimation algorithms, such as Direct Linear Transform (DLT), Iterative Closest Point (ICP), DeepPose, OpenPose, YOLOv8, or any other suitable algorithm or combination of algorithms. For example, for each five-second timeframe included among video data in which the object detection module 225 has detected an object corresponding to hands or fingers of a user, the pose determination module 230 may apply one or more pose estimation algorithms to determine a three-dimensional pose of the user's hands or fingers. In this example, the object detection module 225 may then determine a series of poses of the hands or fingers of the user based on an order of timeframes of the video data for which the poses were determined.

For each of multiple timeframes of video data captured by a camera of a user client device 100, the action prediction module 235 may predict an action being performed by a user associated with the user client device 100 based on a series of poses of one or more portions of a body of the user determined by the pose determination module 230. An action may be associated with a step in a set of instructions for preparing a recipe. Examples of types of actions include: washing, chopping, dicing, stirring, searing, kneading, poaching, filleting, opening, or any other suitable types of actions. In some embodiments, an action is associated with one or more objects detected by the object detection module 225. For example, an action may correspond to opening an object detected by the object detection module 225, such as a cabinet, a refrigerator, or a can of tuna. As an additional example, an action may correspond to chopping an object detected by the object detection module 225 corresponding to an onion with another object detected by the object detection module 225 corresponding to a chef's knife. An action also may be associated with additional types of information, such as a state or a setting associated with an object detected by the object detection module 225, an amount of time associated with the action, or any other suitable types of information. For example, if an action corresponds to turning on a blender, the action also may be associated with a particular speed to which the blender was set detected by the object detection module 225. As an additional example, if an action corresponds to turning on an oven, the action also may be associated with a particular temperature to which the oven was set detected by the object detection module 225. As yet another example, if an action corresponds to boiling pasta, the action may be associated with a state of the pasta corresponding to boiling detected by the object detection module 225 and an amount of time elapsed since the state was detected. Additionally, the action prediction module 235 may predict a series of actions being performed by a user based on an order of timeframes of video data for which the actions were predicted.

In some embodiments, the action prediction module 235 predicts an action being performed by a user using an action prediction model. An action prediction model is a machine-learning model, such as a recurrent neural network (RNN), that is trained to predict an action being performed by a user. In some embodiments, the action prediction module 235 uses a single action prediction model (e.g., a multitask model) that predicts multiple types of actions, while in other embodiments, the action prediction module 235 uses multiple action prediction models that each predict a type of action. To use the action prediction model, the action prediction module 235 may access the model (e.g., from the data store 220) and apply the model to a set of inputs. The set of inputs may include information describing a series of poses of one or more portions of a user's body determined by the pose determination module 230, one or more objects detected by the object detection module 225, or any other suitable types of information. For example, the action prediction module 235 may access and apply the action prediction model to a set of inputs including a series of poses of a user's hand, in which the series of poses indicates that the user's hand is holding an object and that the user's hand is moving upwards and downwards in a repetitive motion. In the above example, the set of inputs also may include information indicating the object is a knife and that the knife is also moving upwards and downwards in the repetitive motion through another object corresponding to an onion. Continuing with this example, the set of inputs also may include information describing pieces of the onion (e.g., their sizes) as the knife moves through it.

Once the action prediction module 235 applies the action prediction model to a set of inputs, the action prediction module 235 may then receive an output from the model. The output may include information describing a predicted action being performed by a user. In the above example, the action prediction module 235 may receive an output from the action prediction model indicating that the user is chopping an onion. Furthermore, the output may be associated with a confidence value associated with a predicted action. In some embodiments, the action prediction model provides an output describing a predicted action if the confidence value is at least a threshold value, while in other embodiments, the confidence value is included in the output with the predicted action. In the above example, the output may include a 95% confidence value the user is chopping an onion, a 55% confidence value the user is dicing an onion, etc. The action prediction module 235 may then store information describing a predicted action among action data in the data store 220. Information describing a predicted action may be stored in association with various types of information (e.g., information describing one or more timeframes of video data depicting a user performing the predicted action, information associated with the user, one or more objects associated with the predicted action, etc.).

Once the action prediction module 235 predicts an action being performed by a user, the action prediction module 235 also may predict that the action is complete (e.g., once the action prediction module 235 predicts the user is performing a different action, once an amount of time associated with the action has elapsed, etc.). For example, suppose that an action corresponding to stirring is associated with a step in a set of instructions for preparing a recipe, in which the step describes an amount of time the action is to be performed (e.g., "stir continuously for 10 minutes"). In this example, the action prediction module 235 may predict that the action is complete when 10 minutes have elapsed since a time that the action prediction module 235 predicted a user began stirring.

The recipe prediction module 240 may predict a recipe being prepared by a user. The recipe prediction module 240 may do so based on a series of actions being performed by the user predicted by the action prediction module 235, one or more objects detected by the object detection module 225, user data for the user, or any other suitable types of information. In some embodiments, the recipe prediction module 240 predicts the recipe being prepared by the user using a recipe prediction model. A recipe prediction model is a machine-learning model trained to predict a recipe being prepared by a user. To use the recipe prediction model, the recipe prediction module 240 may access the model (e.g., from the data store 220) and apply the model to a set of inputs. The set of inputs may include various types of information described above (e.g., the predicted series of actions, the detected object(s), user data for the user, etc.). For example, suppose that a series of actions being performed by a user predicted by the action prediction module 235 (e.g., predicted actions associated with the highest confidence values) include washing potatoes and chopping an onion. In this example, suppose also that objects detected by the object detection module 225 include a stove, a stock pot, various fruits, a can of chicken broth, two cans of tomato paste, an onion, the user's hands, a knife, a sirloin steak, and three potatoes. In this example, the recipe prediction module 240 may access and apply the recipe prediction model to a set of inputs including information describing the series of actions being performed by the user and the objects. In the above example, the set of inputs also may include a set of user data for the user, such as information describing recipes the user recently viewed and information describing the user's favorite items, recipes, and cuisines, and the user's dietary preferences.

Once the recipe prediction module 240 applies the recipe prediction model to a set of inputs, the recipe prediction module 240 may then receive an output from the model. The output may include information describing a predicted recipe being prepared by a user. In the above example, the recipe prediction module 240 may receive an output from the recipe prediction model indicating that the user is preparing a recipe for beef stew. Furthermore, the output may be associated with a confidence value associated with the predicted recipe. In some embodiments, the recipe prediction model provides an output describing a predicted recipe if the confidence value is at least a threshold value, while in other embodiments, the confidence value is included in the output with the predicted recipe. In the above example, the output may include a 97% confidence value the user is preparing beef stew, a 65% confidence value the user is preparing steak with tomato sauce, etc. The recipe prediction module 240 may then store information describing the predicted recipe in the data store 220. The information describing the predicted recipe may be stored in association with various types of information (e.g., information describing one or more timeframes of video data depicting a user preparing the predicted recipe, information associated with the user, one or more objects associated with the predicted recipe, etc.). In some embodiments, the recipe prediction model may be trained by the machine-learning training module 215, as described above.

The suggestion selection module 245 may retrieve various types of data from the data store 220. In some embodiments, the suggestion selection module 245 retrieves a set of recipe data for a recipe that the recipe prediction module 240 predicts a user is preparing (e.g., a set of recipe data for a predicted recipe associated with a highest confidence value). In some embodiments, the suggestion selection module 245 retrieves the set of recipe data for the recipe after the content presentation module 205 receives information from the user confirming they are preparing the recipe. The set of recipe data may include a set of candidate suggestions associated with preparing the recipe. The set of candidate suggestions may include a guide for preparing the recipe (e.g., step-by-step instructions for preparing the recipe), information describing a technique associated with preparing the recipe, or any other suitable types of information associated with preparing the recipe. The set of recipe data retrieved by the suggestion selection module 245 also may include information stored in the recipe graph describing a connection between the recipe and another recipe indicating that the recipes share common ingredients, use a set of common tools or techniques, are often prepared together, etc. In some embodiments, the suggestion selection module 245 also retrieves a set of user data for the user, such as the user's favorite cuisines, items, or recipes, dietary preferences or restrictions associated with the user, etc.

The suggestion selection module 245 also may select one or more suggestions associated with preparing a recipe. A suggestion associated with preparing a recipe may include a guide for preparing the recipe, information describing a technique associated with preparing the recipe, information describing one or more recipes a user may prepare (e.g., one or more additional recipes if the user does not have an ingredient of the recipe or a tool used to prepare the recipe), information describing how the recipe may be modified, or any other suitable types of information. The suggestion selection module 245 may select the suggestion(s) based on a set of recipe data for the recipe (e.g., a set of candidate suggestions), one or more objects detected by the object detection module 225, an action being performed by a user predicted by the action prediction module 235, a set of user data for the user, information received from the user, or any other suitable types of information.

In embodiments in which a suggestion associated with preparing a recipe selected by the suggestion selection module 245 includes information describing a technique associated with preparing the recipe, the suggestion selection module 245 may make the selection based on a measure of deviation of a predicted action being performed by a user from the technique. The suggestion selection module 245 may determine the measure of deviation using a deviation prediction model, which is a machine-learning model trained to predict a measure of deviation of a predicted action being performed by a user from a technique. In some embodiments, the suggestion selection module 245 uses a single deviation prediction model (e.g., a multitask model) that determines the measure of deviation for multiple types of techniques, while in other embodiments, the suggestion selection module 245 uses multiple deviation prediction models that each determine the measure of deviation for a type of technique. To use the deviation prediction model, the suggestion selection module 245 may access the model (e.g., from the data store 220) and apply the model to a set of inputs. The set of inputs may include information describing the action and information describing the technique. For example, suppose that a user has confirmed they are preparing a recipe corresponding to beef stew and that the action prediction module 235 has predicted that the user is performing an action corresponding to chopping an onion. In this example, the suggestion selection module 245 may retrieve a set of recipe data for the recipe including a video demonstrating a technique for chopping an onion. In this example, the suggestion selection module 245 may access and apply the deviation prediction model to a set of inputs including one or more timeframes of video data used to predict the action being performed by the user and the video demonstrating the technique.

Once the suggestion selection module 245 applies the deviation prediction model to a set of inputs, the suggestion selection module 245 may then receive an output from the model. The output may include a predicted measure of deviation of an action being performed by a user from a technique. In the above example, the suggestion selection module 245 may receive an output from the deviation prediction model indicating a predicted measure of deviation of the user's action from the technique for chopping an onion. The suggestion selection module 245 may store the predicted measure of deviation among a set of user data for the user in the data store 220 (e.g., in association with a time at which the measure of deviation was predicted). In some embodiments, the deviation prediction model may be trained by the machine-learning training module 215, as described above.

The suggestion selection module 245 may then determine whether a predicted measure of deviation of a predicted action being performed by a user from a technique is at least a threshold measure of deviation. If the suggestion selection module 245 determines that the predicted measure of deviation is at least the threshold measure of deviation, the suggestion selection module 245 may select a suggestion including information describing the technique. In the above example, if the suggestion selection module 245 determines that the predicted measure of deviation is at least a threshold measure of deviation, the suggestion selection module 245 may select a suggestion that includes the video demonstrating the technique for chopping an onion. In some embodiments, if the suggestion selection module 245 determines that the predicted measure of deviation is at least the threshold measure of deviation, the suggestion selection module 245 selects a suggestion including information describing a different technique for performing the same action. In the above example, if the technique is associated with an intermediate skill level, the suggestion selection module 245 alternatively may select a suggestion that includes a video demonstrating a technique associated with a beginner skill level for chopping an onion. Furthermore, in embodiments in which a technique is associated with one or more tools that are not detected by the object detection module 225, the suggestion selection module 245 may select a suggestion including information describing the tool(s). In the above example, if the technique is associated with a chef's knife and the object detection module 225 does not detect a chef's knife or detects a different type of knife, the suggestion selection module 245 also or alternatively may select a suggestion for the user to use a chef's knife.

In embodiments in which a suggestion associated with preparing a recipe selected by the suggestion selection module 245 includes information describing one or more recipes, the suggestion selection module 245 may select the suggestion based on one or more objects detected by the object detection module 225. For example, suppose that a user has confirmed they are preparing a recipe corresponding to beef stew. In this example, the suggestion selection module 245 may access the recipe graph and identify a recipe for fruit salad that is commonly prepared together with the beef stew based on one or more objects detected by the object detection module 225 corresponding to ingredients of the recipe for the fruit salad. Continuing with this example, the suggestion selection module 245 may then select a suggestion associated with preparing the recipe for beef stew, in which the suggestion includes information describing the recipe for fruit salad. As an additional example, suppose that the content presentation module 205 receives a request from a user to suggest recipes for the user to prepare. In this example, based on one or more objects detected by the object detection module 225 corresponding to ingredients and tools the user has and a set of user data for the user describing the user's favorite cuisines and recipes, the suggestion selection module 245 may compare the object(s) and the user data with objects and attributes associated with various recipes stored in the data store 220. In this example, the suggestion selection module 245 may identify one or more recipes that the user may prepare based on the comparison and select a suggestion associated with preparing the identified recipe(s).

In embodiments in which a suggestion associated with preparing a recipe selected by the suggestion selection module 245 includes information describing one or more recipes, the suggestion selection module 245 also may select the suggestion based on one or more objects associated with preparing the recipe that are not detected by the object detection module 225. The suggestion selection module 245 may do so by comparing one or more objects detected by the object detection module 225 with one or more objects associated with the recipe (e.g., an ingredient of the recipe or a tool used to prepare the recipe) and identifying one or more objects associated with the recipe the user does not have based on the comparison. For example, suppose that the suggestion selection module 245 has compared objects detected by the object detection module 225 with objects associated with a recipe for beef stew a user has confirmed they are preparing and identifies black pepper as an ingredient of the recipe that was not detected by the object detection module 225. In this example, the suggestion selection module 245 may access the recipe graph and identify one or more additional recipes connected to the recipe for beef stew that are associated only with objects detected by the object detection module 225. Continuing with this example, the suggestion selection module 245 may then select a suggestion including the additional recipe(s).

In embodiments in which the suggestion selection module 245 identifies one or more objects associated with a recipe a user does not have, the suggestion selection module 245 also may select a suggestion to place an order including the object(s). To do so, the suggestion selection module 245 may determine or predict an availability of the object(s) at one or more retailer locations within a threshold distance of a delivery location for the user (e.g., based on information stored in the data store 220 or using the availability model described above). The suggestion selection module 245 may then select the suggestion to place an order including the object(s) if the object(s) is/are likely to be available at the retailer location(s). In the above example, the suggestion selection module 245 also or alternatively may select a suggestion to place an order with the online system 140 including the black pepper, in which the suggestion includes information describing an availability of the black pepper at a retailer location closest to a delivery location for the user and an estimated delivery time (e.g., 15 minutes) for the order determined by the order management module 210.

In embodiments in which a suggestion associated with preparing a recipe selected by the suggestion selection module 245 includes information describing how the recipe may be modified, the suggestion selection module 245 may select the suggestion based on one or more objects detected by the object detection module 225, based on user data for a user, or any other suitable types of information. For example, suppose that a set of recipe data for a recipe for steak includes a steak that is one inch thick as an ingredient and instructions to cook the steak in a skillet on medium-high heat for one minute on each side before baking in the oven and the object detection module 225 detects a steak that is one and a half inches in thickness. In this example, based on the thickness of the steak detected by the object detection module 225, the suggestion selection module 245 may access other recipes to which the recipe is connected in the recipe graph that include steaks that are one and a half inches in thickness as an ingredient and use the same technique of cooking in a skillet before baking in the oven. Continuing with this example, the suggestion selection module 245 may then select a suggestion to cook the steak for slightly longer on each side or at a different temperature based on the instructions in the other recipes. As an additional example, suppose that a user has confirmed they are making a recipe for a salad and that the suggestion selection module 245 has retrieved a set of user data for the user indicating that the user's favorite cuisine is Italian. In this example, the suggestion selection module 245 may access other recipes to which the recipe is connected in the recipe graph that include ingredients similar to those included in the salad the user is making. In the above example, if some of the recipes are associated with Italian cuisine and include additional ingredients corresponding to one clove of garlic and two tablespoons of basil, and user data for the user indicates that the user likely has these ingredients, the suggestion selection module 245 may select a suggestion to modify the recipe for the salad by adding the additional ingredients to make it more similar to salads associated with Italian cuisine.

Figure 2B:
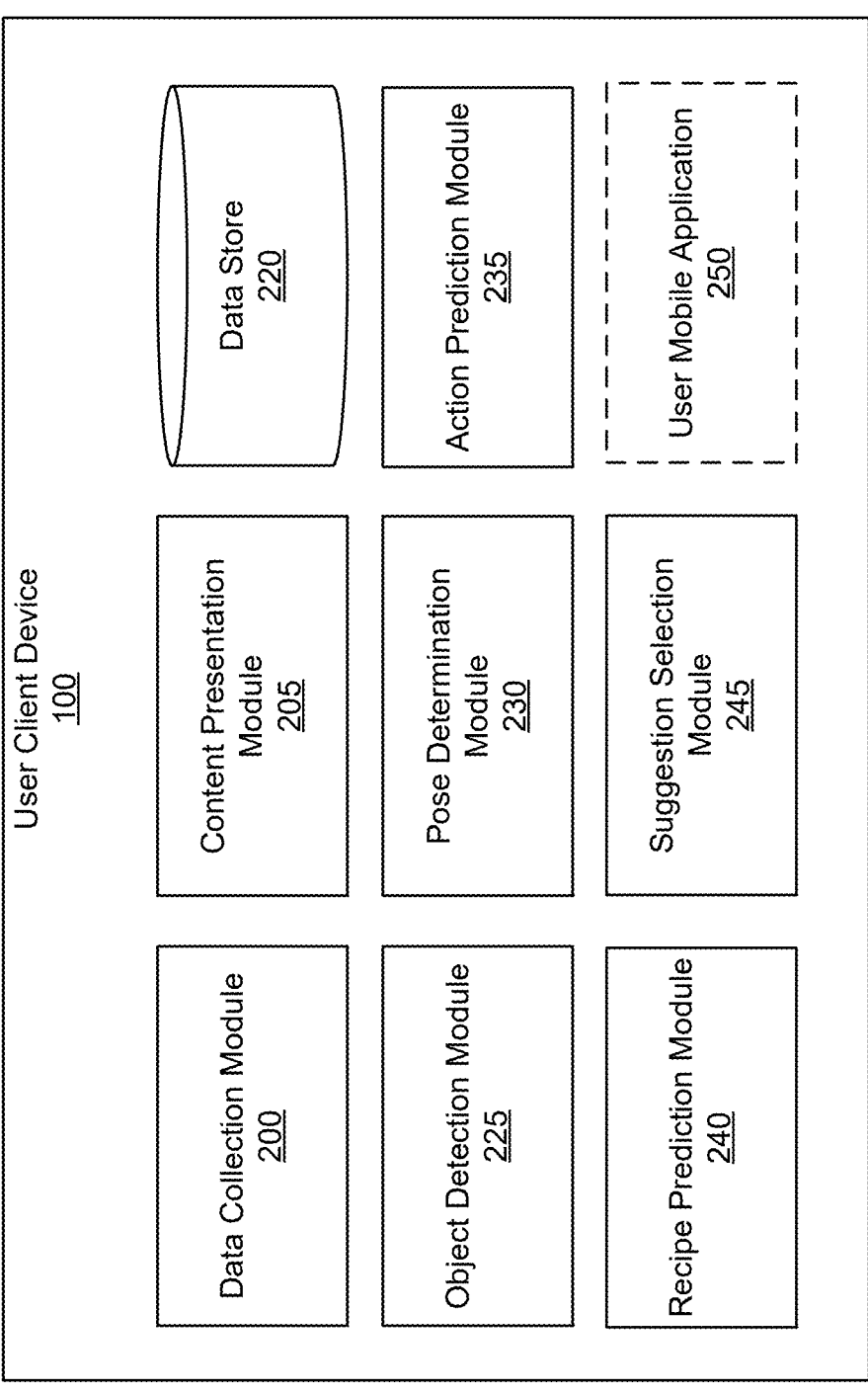
FIG. 2B illustrates an example system architecture for a user client device, in accordance with one or more embodiments.

FIG. 2B illustrates an example system architecture for a user client device 100, in accordance with some embodiments. The system architecture illustrated in FIG. 2B includes the data collection module 200, the content presentation module 205, the data store 220, the object detection module 225, the pose determination module 230, the action prediction module 235, the recipe prediction module 240, and the suggestion selection module 245. In some embodiments, the system architecture also includes a user mobile application 250. Alternative embodiments may include more, fewer, or different components from those illustrated in FIG. 2B, and the functionality of each component may be divided between the components differently from the description below. Additionally, each component may perform their respective functionalities in response to a request from a human, or automatically without human intervention.

The functionality of the components of the user client device 100 perform some or all of the functions in a manner analogous to that described above with respect to FIG. 2A. For example, in embodiments in which the content presentation module 205 is a component of the user client device 100, once the content presentation module 205 generates an augmented reality element, the content presentation module 205 displays the augmented reality element in a display area of the user client device 100 (e.g., a screen of a smartphone or lenses of a pair of augmented reality glasses). In embodiments in which the user client device 100 includes the user mobile application 250, the user mobile application 250 may allow a user to access the ordering interface that allows the user to search for items that are available through the online system 140, to place orders with the online system 140, etc. and to access the communication interface that allows the user to communicate with a picker that is servicing the user's order. For example, via the user mobile application 250, a user may select items corresponding to ingredients or tools the user needs to prepare a recipe and place an order including the selected items.

Figure 3:
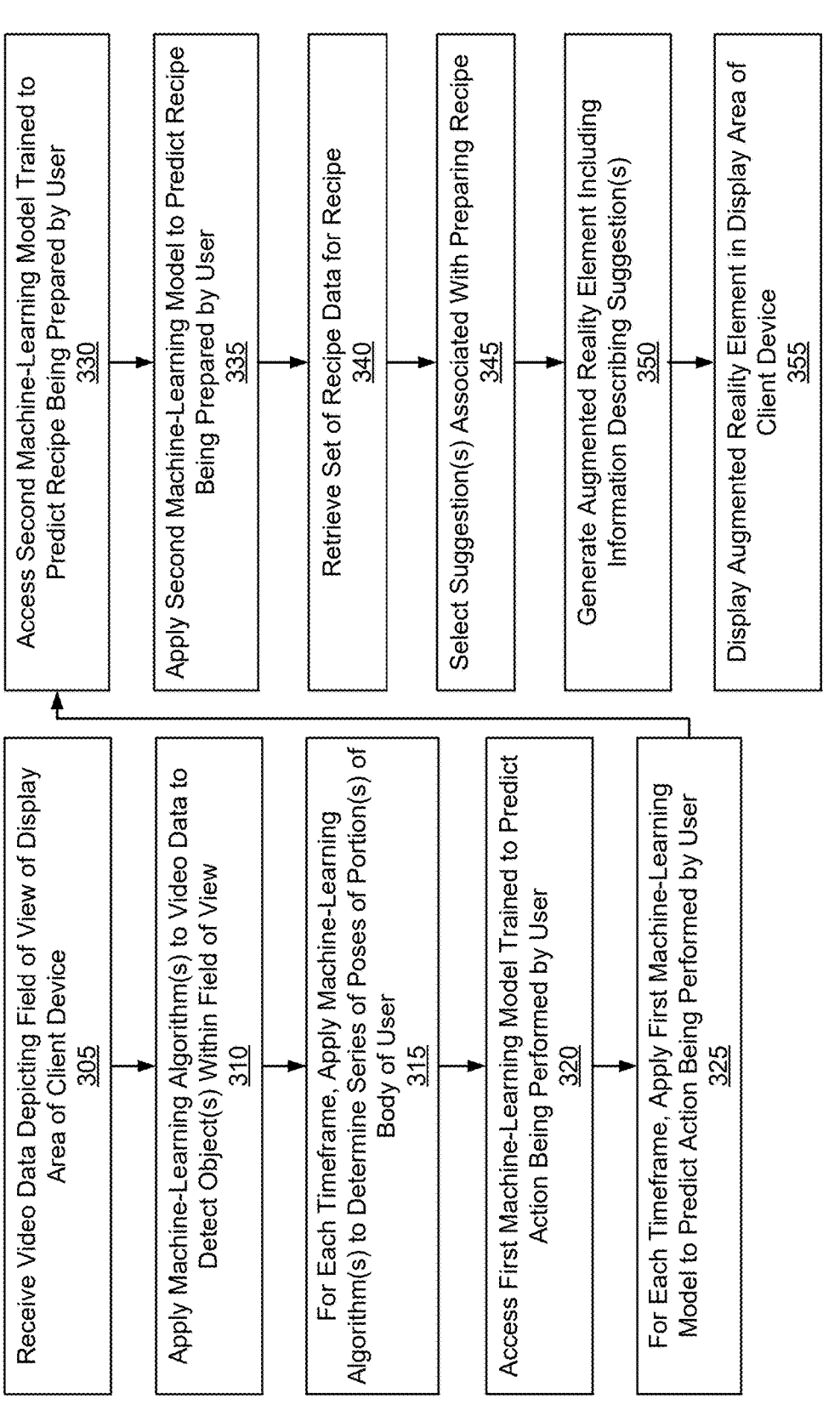
FIG. 3 is a flowchart of a method for displaying a recipe preparation suggestion in an augmented reality element based on a predicted recipe being prepared, in accordance with one or more embodiments.

FIG. 3 is a flowchart of a method for displaying a recipe preparation suggestion in an augmented reality element based on a predicted recipe being prepared, in accordance with some embodiments. Alternative embodiments may include more, fewer, or different steps from those illustrated in FIG. 3, and the steps may be performed in a different order from that illustrated in FIG. 3. These steps may be performed by a user client device (e.g., user client device 100), such as an augmented reality device, or an online system (e.g., online system 140) communicating with the user client device, such as an online concierge system. Additionally, each of these steps may be performed automatically by the user client device 100 or the online system 140 without human intervention.

The user client device 100/online system 140 receives (step 305, e.g., via the object detection module 225) video data captured by a camera of the user client device 100, in which the video data depicts a field of view of a display area of the user client device 100. As described above, the user client device 100 may be an augmented reality (AR) device or a mixed reality (MR) device that integrates digital elements (e.g., visual, audio, haptic, etc.) with a user's environment in real time, or a personal or mobile computing device having the capabilities of an AR or MR device.

The user client device 100/online system 140 then detects (e.g., using the object detection module 225) one or more objects within the field of view of the display area of the user client device 100 based on the video data. The user client device 100/online system 140 may detect the object(s) by applying 310 one or more machine-learning algorithms to the video data, in which the algorithm(s) detect the object(s) based on shapes, colors, patterns, etc. depicted in the video data. Examples of such types of algorithms include: single-shot detector (SSD), you only look once (YOLO), region-based convolutional neural networks (R-CNN), optical character recognition (OCR), natural language processing (NLP), or any other suitable algorithm or combination of algorithms.

When detecting an object, the user client device 100/online system 140 may determine (e.g., using the object detection module 225) a class to which the object belongs, as well as a location (e.g., a bounding box) of the object within the video data. A class may correspond to an ingredient of a recipe, a tool (e.g., a knife, a frying pan, etc.) used to prepare a recipe, a portion of a body of a user associated with the user client device 100 (e.g., one or more fingers, hands, arms, etc. of the user), or any other suitable type of object (e.g., a refrigerator, a cabinet door, a pantry, etc.). Additionally, once the user client device 100/online system 140 detects an object, the user client device 100/online system 140 may track (e.g., using the object detection module 225) the movement of the object or portions of the object (e.g., by tracking coordinates of a bounding box that identifies its location). When detecting an object, the user client device 100/online system 140 also may detect (e.g., using the object detection module 225) one or more attributes of the object. Examples of attributes of an object include: a quantity, a dimension, a size, an amount, a quality (e.g., freshness, ripeness, etc.), a version/variety (e.g., a flavor, low fat, gluten-free, organic, etc.), a state (e.g., boiling, simmering, baking, chopped, minced, scrambled, etc.), a setting (e.g., a speed, a temperature, etc.), or any other suitable attribute of the object.

Once the user client device 100/online system 140 detects an object, the user client device 100/online system 140 may store (e.g., using the object detection module 225) information describing the object (e.g., a class of the object, a location of the object, one or more attributes of the object, etc. in the data store 220). The information describing the object may be stored in association with various types of information. Examples of such types of information include: a time at which it was detected, information describing the user associated with the user client device 100 that captured the video data, a location of the object when it was detected (e.g., in a kitchen, a refrigerator, etc.), or any other suitable types of information.

Once the user client device 100/online system 140 detects one or more objects corresponding to one or more portions of a body of the user associated with the user client device 100, the user client device 100/online system 140 may determine (e.g., using the pose determination module 230) a series of poses of the portion(s) of the body of the user. The user client device 100/online system 140 may do so by applying 315 (e.g., using the pose determination module 230) one or more machine-learning algorithms to each of multiple timeframes of the video data. The machine-learning algorithms may include pose estimation algorithms, such as Direct Linear Transform (DLT), Iterative Closest Point (ICP), DeepPose, OpenPose, YOLOv8, or any other suitable algorithm or combination of algorithms.

For each of the multiple timeframes of the video data, the user client device 100/online system 140 may then predict (e.g., using the action prediction module 235) an action being performed by the user associated with the user client device 100 based on the series of poses of the portion(s) of the body of the user. An action may be associated with a step in a set of instructions for preparing a recipe. Examples of types of actions include: washing, chopping, dicing, stirring, searing, kneading, poaching, filleting, opening, or any other suitable types of actions. In some embodiments, an action is associated with one or more objects detected by the user client device 100/online system 140. An action also may be associated with additional types of information, such as a state or a setting associated with an object detected by the user client device 100/online system 140, an amount of time associated with the action, or any other suitable types of information. Additionally, the user client device 100/online system 140 may predict a series of actions being performed by the user based on an order of timeframes of video data for which the actions were predicted.

In some embodiments, the user client device 100/online system 140 predicts an action being performed by the user using an action prediction model. An action prediction model is a machine-learning model, such as a recurrent neural network (RNN), that is trained to predict an action being performed by a user. In some embodiments, the user client device 100/online system 140 uses a single action prediction model (e.g., a multitask model) that predicts multiple types of actions, while in other embodiments, the user client device 100/online system 140 uses multiple action prediction models that each predict a type of action. To use the action prediction model, the user client device 100/online system 140 may access 320 (e.g., using the action prediction module 235) the model (e.g., from the data store 220) and apply 325 (e.g., using the action prediction module 235) the model to a set of inputs. The set of inputs may include information describing the series of poses of the portion(s) of the user's body, the detected object(s), or any other suitable types of information.

Once the user client device 100/online system 140 applies 325 the action prediction model to the set of inputs, the user client device 100/online system 140 may then receive (e.g., via the action prediction module 235) an output from the model. The output may include information describing a predicted action being performed by the user. Furthermore, the output may be associated with a confidence value associated with a predicted action. In some embodiments, the action prediction model provides an output describing a predicted action if the confidence value is at least a threshold value, while in other embodiments, the confidence value is included in the output with the predicted action. The user client device 100/online system 140 may then store (e.g., using the action prediction module 235) information describing a predicted action among action data (e.g., in the data store 220). Information describing a predicted action may be stored in association with various types of information (e.g., information describing one or more timeframes of the video data depicting the user performing the predicted action, information associated with the user, one or more objects associated with the predicted action, etc.). Once the user client device 100/online system 140 predicts an action being performed by the user, the user client device 100/online system 140 also may predict (e.g., using the action prediction module 235) that the action is complete (e.g., once the user client device 100/online system 140 predicts the user is performing a different action, once an amount of time associated with the action has elapsed, etc.).

The user client device 100/online system 140 may then predict (e.g., using the recipe prediction module 240) a recipe being prepared by the user. The user client device 100/online system 140 may do so based on the predicted series of actions being performed by the user, the detected object(s), user data for the user, or any other suitable types of information. In some embodiments, the user client device 100/online system 140 predicts the recipe being prepared by the user using a recipe prediction model. A recipe prediction model is a machine-learning model trained to predict a recipe being prepared by a user. To use the recipe prediction model, the user client device 100/online system 140 may access 330 (e.g., using the recipe prediction module 240) the model (e.g., from the data store 220) and apply 335 (e.g., using the recipe prediction module 240) the model to a set of inputs. The set of inputs may include various types of information described above (e.g., the predicted series of actions, the detected object(s), user data for the user, etc.).

FIGS. 4A-4F illustrate examples of recipe preparation suggestions displayed via an augmented reality element, in accordance with one or more embodiments. Referring first to the example of FIG. 4A, suppose that the predicted series of actions being performed by the user (e.g., predicted actions associated with the highest confidence values) include washing potatoes and chopping an onion. In this example, suppose also that the detected objects 405 include a stove 405A, a stock pot 405B, various fruits 405C-F, a can of chicken broth 405G, two cans of tomato paste 405H, an onion 4051, the user's hands 405J, a knife 405K, a sirloin steak 405L, and three potatoes 405M. In this example, the user client device 100/online system 140 may access 330 and apply 335 the recipe prediction model to a set of inputs including information describing the series of actions being performed by the user and the objects 405. In the above example, the set of inputs also may include a set of user data for the user, such as information describing recipes the user recently viewed and information describing the user's favorite items, recipes, and cuisines, and the user's dietary preferences.

Once the user client device 100/online system 140 applies 335 the recipe prediction model to the set of inputs, the user client device 100/online system 140 may then receive (e.g., via the recipe prediction module 240) an output from the model. The output may include information describing the predicted recipe being prepared by the user. Furthermore, the output may be associated with a confidence value associated with the predicted recipe. In some embodiments, the recipe prediction model provides an output describing the predicted recipe if the confidence value is at least a threshold value, while in other embodiments, the confidence value is included in the output with the predicted recipe. The user client device 100/online system 140 may then store (e.g., using the recipe prediction module 240) information describing the predicted recipe (e.g., in the data store 220). The information describing the predicted recipe may be stored in association with various types of information (e.g., information describing one or more timeframes of the video data depicting the user preparing the predicted recipe, information associated with the user, one or more objects 405 associated with the predicted recipe, etc.). In some embodiments, the recipe prediction model may be trained by the online system 140 (e.g., using the machine-learning training module 215).

Figure 4A:
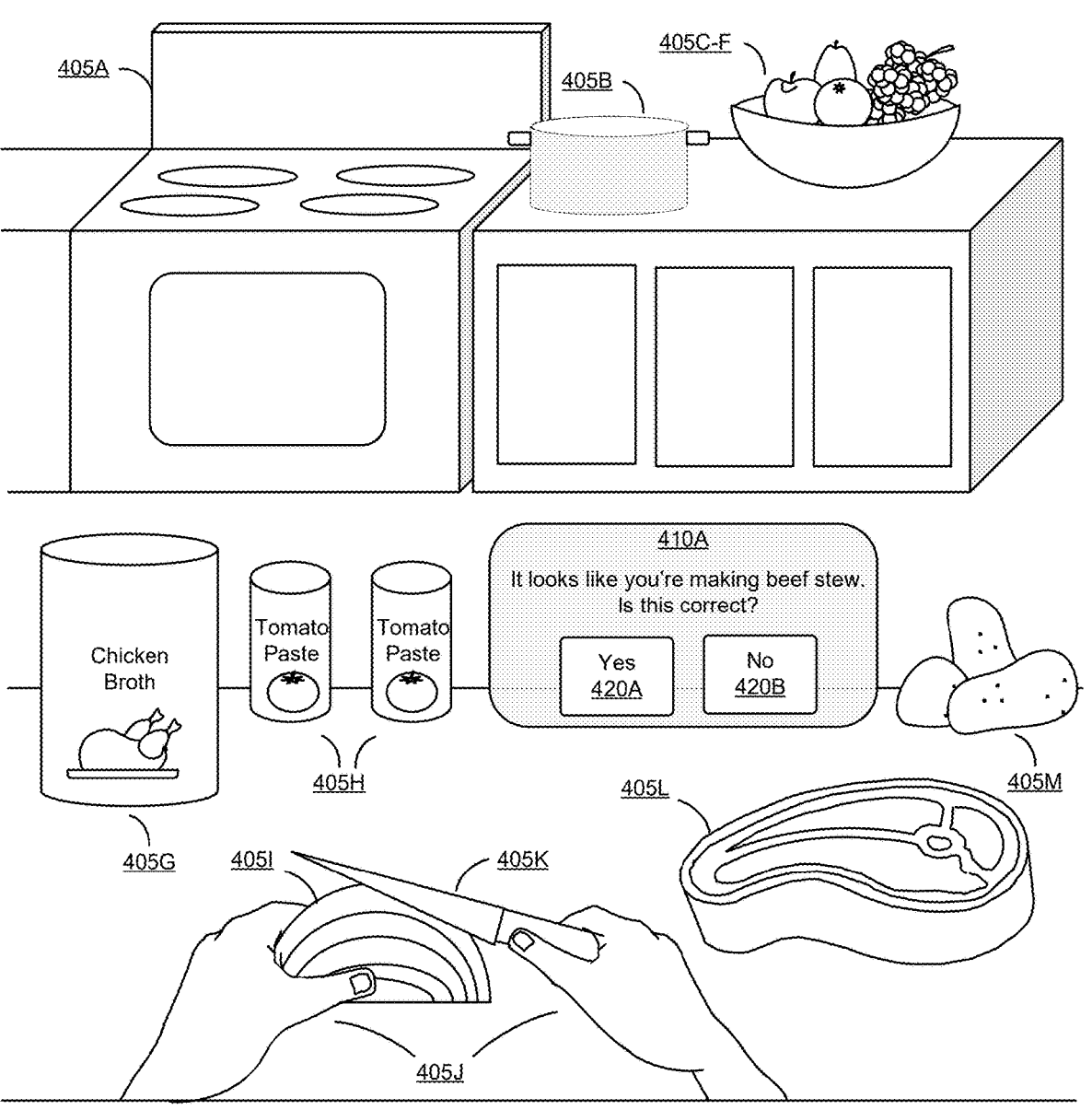
FIGS. 4A-4F illustrate examples of recipe preparation suggestions displayed via an augmented reality element, in accordance with one or more embodiments.

In some embodiments, the user client device 100/online system 140 generates (e.g., using the content presentation module 205) an augmented reality element including a prompt to confirm the user is preparing the predicted recipe and the augmented reality element may be displayed in the display area of the user client device 100. In the above example, suppose that the user client device 100/online system 140 predicts the user is preparing a recipe for beef stew. In this example, as shown in FIG. 4A, the user client device 100/online system 140 may generate an augmented reality element 410A including a prompt asking the user to confirm the user is preparing a predicted recipe, which is then displayed 355 in the display area of the user client device 100. In this example, the augmented reality element 410A may include information (e.g., text, an image, or a video) describing the predicted recipe, as well as interactive elements corresponding to a button 420A that allows the user to confirm they are preparing the predicted recipe and another button 420B that allows the user to indicate they are not preparing the predicted recipe. In some embodiments, the prompt may be communicated to the user via other means (e.g., spoken instructions asking the user to confirm whether they are preparing the predicted recipe). The user client device 100/online system 140 may then receive (e.g., via the content presentation module 205) a response to the prompt. Continuing with the above example, the user client device 100/online system 140 may receive a response to the prompt when the user interacts with a button 420A-B included in the augmented reality element 410A corresponding to the response (e.g., via a gesture, by clicking on the button 420A-B, etc.) or via a voice command received from the user.

Referring back to FIG. 3, the user client device 100/online system 140 may retrieve (step 340, e.g., using the suggestion selection module 245) various types of data (e.g., from the data store 220). In some embodiments, the user client device 100/online system 140 retrieves 340 a set of recipe data for the predicted recipe (e.g., a set of recipe data for a predicted recipe associated with a highest confidence value). In some embodiments, the user client device 100/online system 140 retrieves 340 the set of recipe data for the predicted recipe after it receives information from the user confirming they are preparing the predicted recipe. The set of recipe data may include a set of candidate suggestions associated with preparing the predicted recipe. The set of candidate suggestions may include a guide for preparing the predicted recipe (e.g., step-by-step instructions for preparing the predicted recipe), information describing a technique associated with preparing the predicted recipe, or any other suitable types of information associated with preparing the predicted recipe. The set of recipe data retrieved 340 by the user client device 100/online system 140 also may include information stored in the recipe graph describing a connection between the predicted recipe and another recipe indicating that the recipes share common ingredients, use a set of common tools or techniques, are often prepared together, etc. In some embodiments, the user client device 100/online system 140 also retrieves 340 a set of user data for the user, such as the user's favorite cuisines, items, or recipes, dietary preferences or restrictions associated with the user, etc.

The user client device 100/online system 140 then selects 345 (e.g., using the suggestion selection module 245) one or more suggestions associated with preparing the predicted recipe. A suggestion associated with preparing the predicted recipe may include a guide for preparing the predicted recipe, information describing a technique associated with preparing the predicted recipe, information describing one or more additional recipes the user may prepare if the user does not have an ingredient of the predicted recipe or a tool used to prepare the predicted recipe, information describing how the predicted recipe may be modified, or any other suitable types of information. The user client device 100/online system 140 may select 345 the suggestion(s) based on the set of recipe data for the predicted recipe (e.g., the set of candidate suggestions), the detected object(s) 405, a predicted action being performed by the user, the set of user data for the user, information received from the user, or any other suitable types of information.

The user client device 100/online system 140 may then generate 350 (e.g., using the content presentation module 205) an augmented reality element 410 based on the selected suggestion(s) associated with preparing the predicted recipe, which may then be displayed 355 (e.g., using the content presentation module 205) in the display area of the user client device 100. When displayed 355, the augmented reality element 410 may be overlaid onto a portion of the display area of the user client device 100 based on a location of an object 405 detected by the user client device 100/online system 140 within the field of view of the display area. For example, the augmented reality element 410 may be overlaid onto a portion of the display area of the user client device 100 other than a location at which each hand of the user of the user client device 100 is detected (e.g., outside of a bounding box that identifies the location), such that the augmented reality element 410 does not obstruct the user's view of their hands.

In embodiments in which a suggestion associated with preparing the predicted recipe selected 345 by the user client device 100/online system 140 includes information describing a technique associated with preparing the predicted recipe, the user client device 100/online system 140 may make the selection based on a measure of deviation of a predicted action being performed by the user from the technique. The user client device 100/online system 140 may determine (e.g., using the suggestion selection module 245) the measure of deviation using a deviation prediction model, which is a machine-learning model trained to predict a measure of deviation of a predicted action being performed by a user from a technique. In some embodiments, the user client device 100/online system 140 uses a single deviation prediction model (e.g., a multitask model) that determines the measure of deviation for multiple types of techniques, while in other embodiments, the user client device 100/online system 140 uses multiple deviation prediction models that each determine the measure of deviation for a type of technique.

To use the deviation prediction model, the user client device 100/online system 140 may access (e.g., using the suggestion selection module 245) the model (e.g., from the data store 220) and apply (e.g., using the suggestion selection module 245) the model to a set of inputs. The set of inputs may include information describing the action and information describing the technique. For example, suppose that in response to the prompt included in the augmented reality element 410A shown in FIG. 4A asking the user to confirm the user is preparing the predicted recipe corresponding to beef stew, the user has confirmed they are preparing the predicted recipe and the user client device 100/online system 140 has predicted that the user is performing an action corresponding to chopping the onion 4051. In this example, the user client device 100/online system 140 may retrieve 340 a set of recipe data for the predicted recipe including a video demonstrating a technique for chopping an onion. In this example, the user client device 100/online system 140 may access and apply the deviation prediction model to a set of inputs including one or more timeframes of the video data used to predict the action being performed by the user and the video demonstrating the technique.

Once the user client device 100/online system 140 applies the deviation prediction model to the set of inputs, the user client device 100/online system 140 may then receive (e.g., via the suggestion selection module 245) an output from the model, which may include the predicted measure of deviation. In the above example, the user client device 100/online system 140 may receive an output from the deviation prediction model indicating a predicted measure of deviation of the user's action from the technique for chopping an onion. The user client device 100/online system 140 may store (e.g., using the suggestion selection module 245) the predicted measure of deviation among a set of user data for the user (e.g., in the data store 220 in association with a time at which the measure of deviation was predicted). In some embodiments, the deviation prediction model may be trained by the online system 140 (e.g., using the machine-learning training module 215).

Figure 4B:
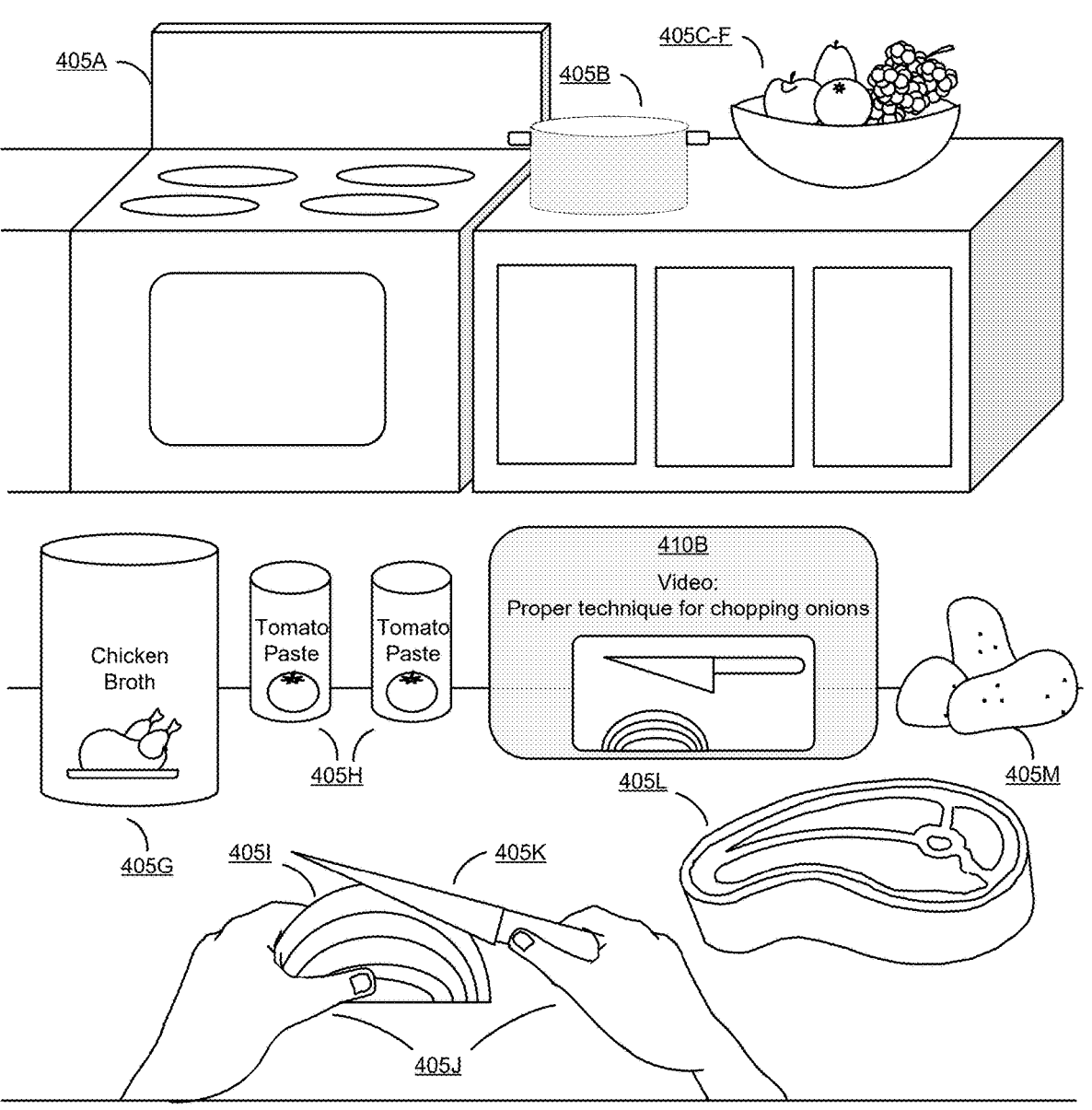

The user client device 100/online system 140 may then determine (e.g., using the suggestion selection module 245) whether the predicted measure of deviation is at least a threshold measure of deviation. If the user client device 100/online system 140 determines that the predicted measure of deviation is at least the threshold measure of deviation, the user client device 100/online system 140 may select 345 a suggestion including information describing the technique. As shown in the example of FIG. 4B, which continues the example described above in conjunction with FIG. 4A, suppose that the user client device 100/online system 140 determines that the predicted measure of deviation is at least the threshold measure of deviation. In this example, the user client device 100/online system 140 may select 345 a suggestion that includes the video demonstrating the technique for chopping an onion and generate 350 the augmented reality element 410B including information describing the suggestion, which is then displayed 355. In some embodiments, if the user client device 100/online system 140 determines that the predicted measure of deviation is at least the threshold measure of deviation, the user client device 100/online system 140 selects 345 a suggestion including information describing a different technique for performing the same action. In the above example, if the technique is associated with an intermediate skill level, the user client device 100/online system 140 alternatively may select 345 a suggestion that includes a video demonstrating a technique associated with a beginner skill level for chopping an onion. Furthermore, in embodiments in which the technique is associated with one or more tools that are not detected by the user client device 100/online system 140, the user client device 100/online system 140 may select 345 a suggestion including information describing the tool(s). In the above example, if the technique is associated with a chef's knife and the user client device 100/online system 140 does not detect a chef's knife or detects a different type of knife, the user client device 100/online system 140 also or alternatively may select 345 a suggestion for the user to use a chef's knife.

Figure 4C:
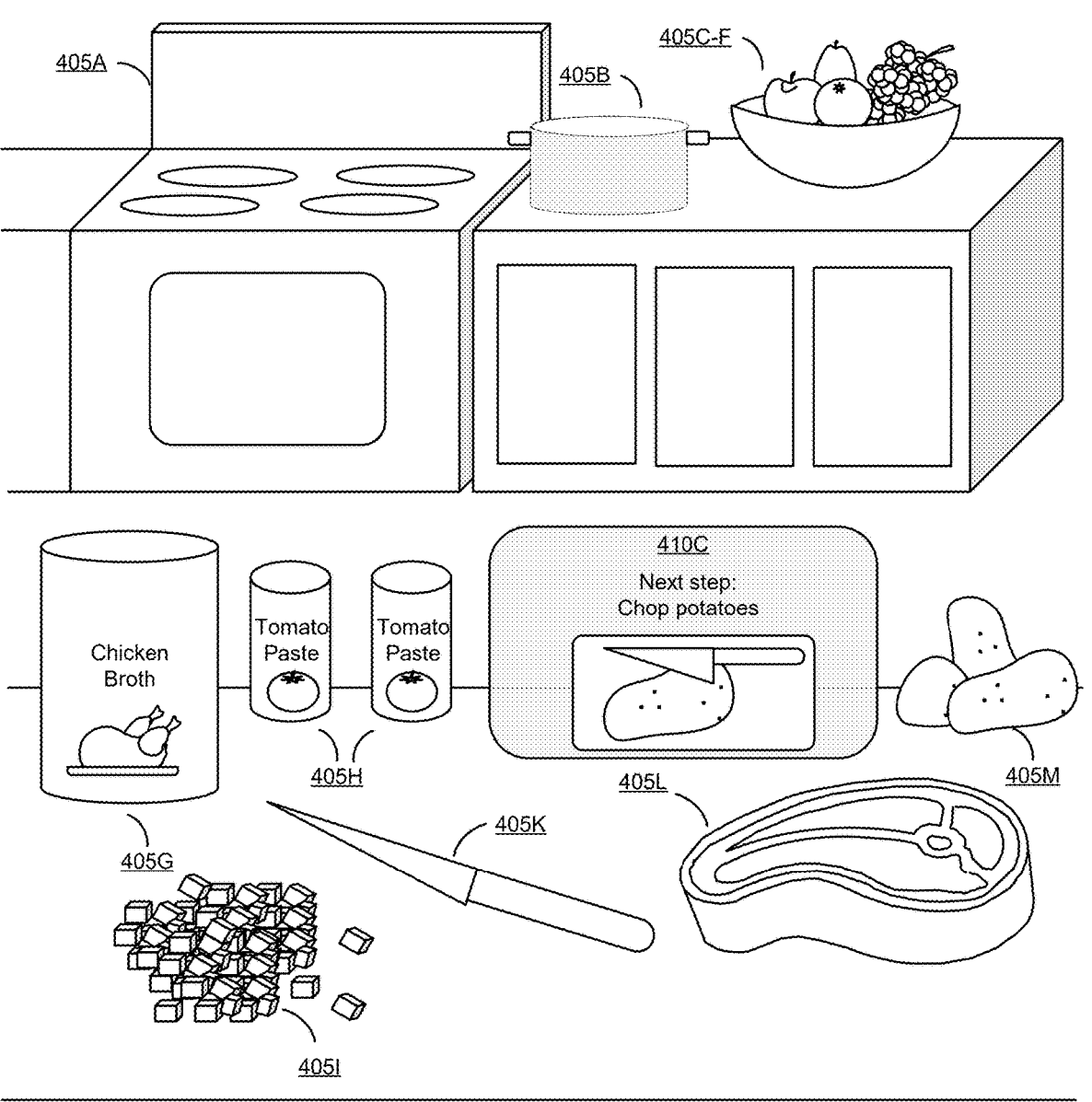

In embodiments in which the augmented reality element 410 generated 350 by the user client device 100/online system 140 includes a guide for preparing the predicted recipe, the guide may correspond to a set of step-by-step instructions for preparing the predicted recipe. For example, suppose that the augmented reality element 410 generated 350 by the user client device 100/online system 140 includes a video describing a step included in a set of step-by-step instructions for preparing the predicted recipe and that the user client device 100/online system 140 predicts an action associated with the step has been completed. As shown in the example of FIG. 4C, which continues the example described above in conjunction with FIGS. 4A-4B, if the completed action corresponds to chopping the onion 4051, the user client device 100/online system 140 may generate 350 an additional augmented reality element 410C or update (e.g., using the content presentation module 205) the augmented reality element 410B to include a video describing a subsequent step of the set of step-by-step instructions corresponding to chopping potatoes 405M. Alternatively, in the above example, the augmented reality element 410 may indicate the step has been completed (e.g., based on an amount of time elapsed since the user began performing the step). In some embodiments, the user client device 100/ online system 140 generates 350 the augmented reality element 410 including the set of step-by-step instructions for preparing the predicted recipe in response to receiving information confirming the user is preparing the recipe.

In embodiments in which a suggestion associated with preparing the predicted recipe selected 345 by the user client device 100/online system 140 includes information describing one or more additional recipes, the user client device 100/online system 140 may select 345 the suggestion based on one or more objects 405 associated with preparing the predicted recipe that are not detected by the user client device 100/online system 140. The user client device 100/ online system 140 may do so by comparing (e.g., using the suggestion selection module 245) the detected object(s) 405 with one or more objects 405 associated with the predicted recipe (e.g., an ingredient of the recipe or a tool used to prepare the recipe) and identifying (e.g., using the suggestion selection module 245) one or more objects 405 associated with the predicted recipe the user does not have based on the comparison.

Figure 4D:
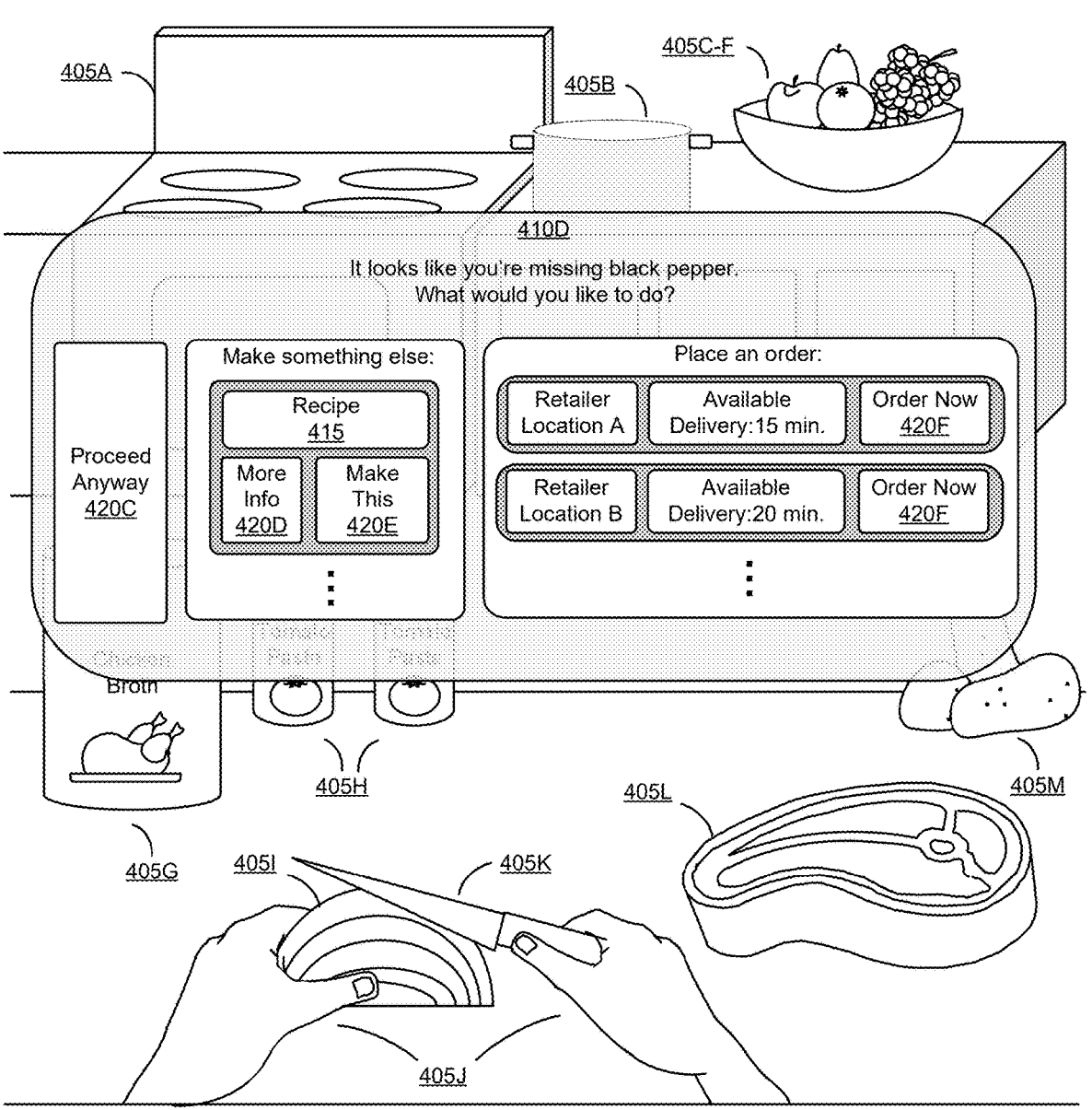

The following illustrates an example of how the user client device 100/online system 140 may select 345 a suggestion associated with preparing the predicted recipe based on one or more objects 405 associated with preparing the predicted recipe that are not detected by the user client device 100/online system 140. Suppose that after receiving information from the user confirming they are preparing the predicted recipe corresponding to beef stew, the user client device 100/online system 140 compares the detected object(s) 405 with objects 405 associated with the predicted recipe and identifies black pepper as an ingredient of the predicted recipe that was not among the detected object(s) 405. In this example, the user client device 100/online system 140 may access (e.g., using the suggestion selection module 245) the recipe graph and identify (e.g., using the suggestion selection module 245) one or more additional recipes connected to the predicted recipe that are associated only with the detected object(s) 405. Continuing with this example, as shown in FIG. 4D, the user client device 100/online system 140 may then select 345 a suggestion including the additional recipe(s) 415 and generate 350 the augmented reality element 410D including the suggestion, which is then displayed 355. As also shown in FIG. 4D, the augmented reality element 410D also may include interactive elements, such as a button 420C that allows the user to select an option to proceed anyway, a button 420D that allows the user to view more information associated with an additional recipe 415, and a button 420E that allows the user to select an option to prepare an additional recipe 415.

In embodiments in which the user client device 100/ online system 140 identifies one or more objects 405 associated with the predicted recipe the user does not have, the user client device 100/online system 140 also may select 345 a suggestion to place an order including the identified object(s) 405. To do so, the user client device 100/online system 140 may determine (e.g., using the suggestion selection module 245) or predict (e.g., using the suggestion selection module 245) an availability of the identified object(s) 405 at one or more retailer locations within a threshold distance of a delivery location for the user (e.g., based on information stored in the data store 220 or using the availability model described above). The user client device 100/online system 140 may then select 345 the suggestion to place an order including the identified object(s) 405 if the identified object(s) 405 is/are likely to be available at the retailer location(s). In the above example, the user client device 100/online system 140 also or alternatively may select 345 a suggestion to place an order with the online system 140 including the black pepper, which may be included in the augmented reality element 410D, as shown in FIG. 4D. As also shown in FIG. 4D, the suggestion may include information describing an availability of the black pepper at retailer locations closest to a delivery location for the user and an estimated delivery time for the order if placed with each retailer location determined by the user client device 100/online system 140 (e.g., using the order management module 210). In this example, the augmented reality element 410D also may include a button 420F that allows the user to select an option to place the order from a retailer location (e.g., via the user mobile application 250).

Figure 4E:
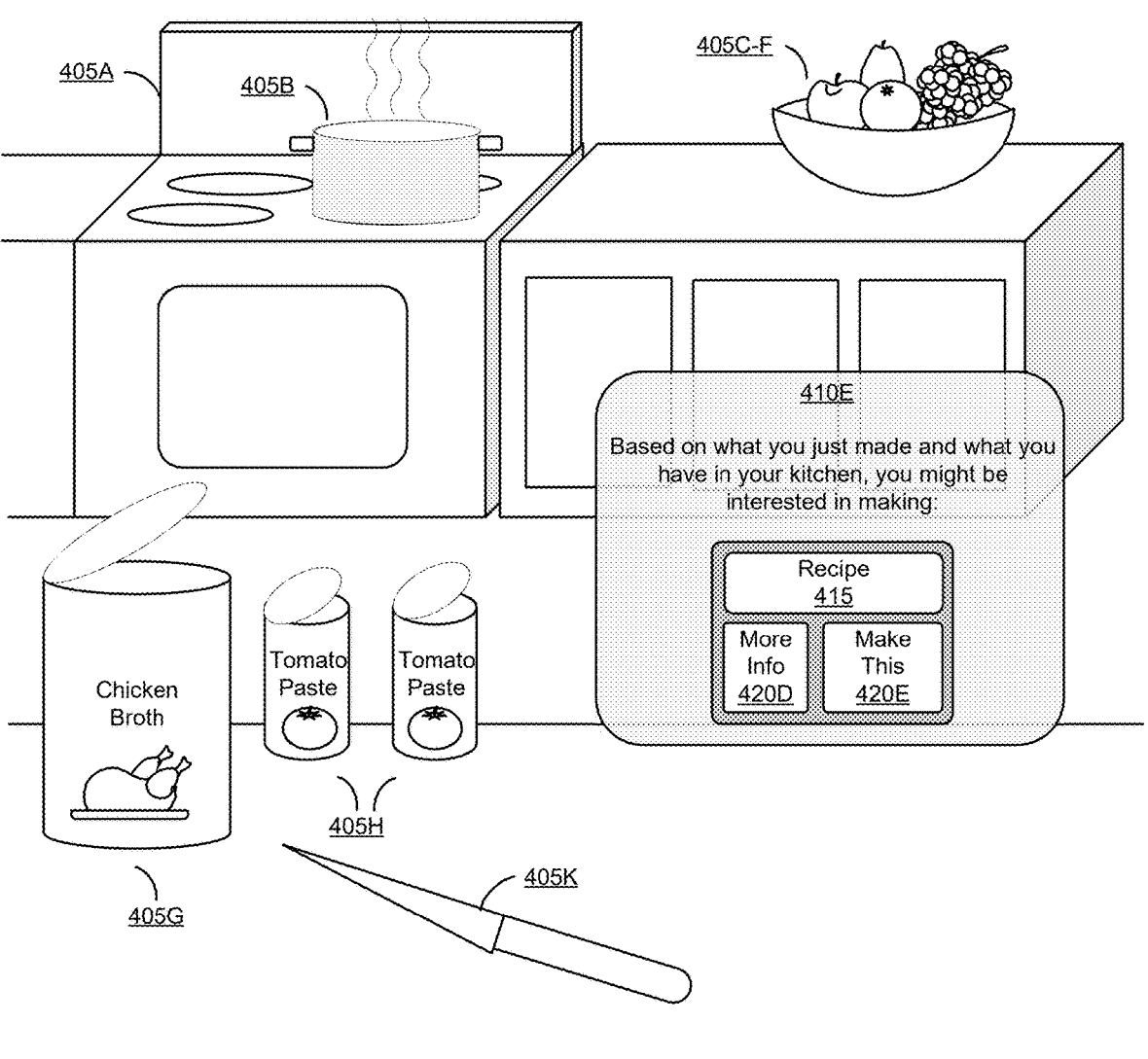

In embodiments in which a suggestion associated with preparing the predicted recipe selected 345 by the user client device 100/online system 140 includes information describing one or more additional recipes, the user client device 100/online system 140 also may select 345 the suggestion based on the detected object(s) 405. For example, as shown in FIG. 4E, suppose that the user has confirmed they are preparing the predicted recipe corresponding to beef stew and are almost done with a last step in a set of instructions for preparing the beef stew. In this example, the user client device 100/online system 140 may access (e.g., using the suggestion selection module 245) the recipe graph and identify (e.g., using the suggestion selection module 245) a recipe for fruit salad that is commonly prepared together with the beef stew based on various fruits 405C-F detected by the user client device 100/online system 140 corresponding to ingredients of the recipe for the fruit salad. Continuing with this example, the user client device 100/online system 140 may then select 345 a suggestion including information describing the recipe 415 for fruit salad and generate 350 the augmented reality element 410E including information describing the suggestion, which is then displayed 355. As also shown in FIG. 4E, the augmented reality element 410E may include information describing the recipe 415 for fruit salad, a button 420D that allows the user to view more information associated with the recipe 415 for fruit salad, and a button 420E that allows the user to select an option to prepare the recipe 415 for fruit salad.

Figure 4F:
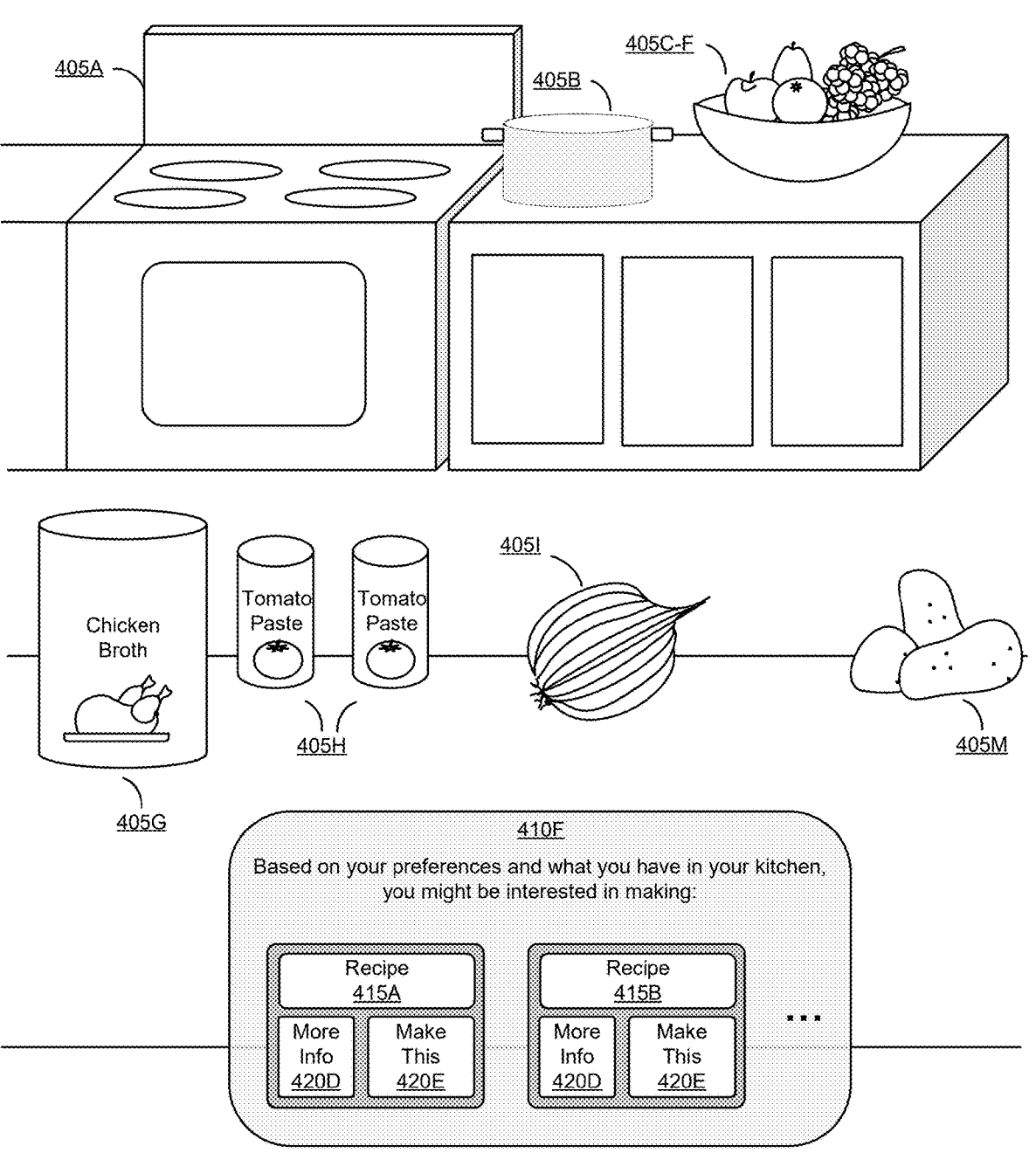

In some embodiments, the augmented reality element 410 generated 350 by the user client device 100/online system 140 includes information describing one or more recipes the user may prepare, which the user client device 100/online system 140 may generate 350 in response to receiving (e.g., via the content presentation module 205) a request from the user client device 100 to suggest the recipe(s). The user client device 100/online system 140 may receive the request via a voice command, a physical controller associated with the user client device 100, a touch screen of the user client device 100, etc. For example, suppose that the user client device 100/online system 140 receives a request from the user to suggest recipes for the user to prepare. In this example, based on the detected object(s) 405 corresponding to ingredients and tools the user has and the set of user data for the user describing the user's favorite cuisines and recipes, the user client device 100/online system 140 may compare (e.g., using the suggestion selection module 245) the object(s) 405 and the user data with objects 405 and attributes associated with various recipes (e.g., stored in the data store 220). In this example, the user client device 100/online system 140 may identify (e.g., using the suggestion selection module 245) recipes that the user may prepare based on the comparison and select 345 a suggestion associated with preparing the identified recipes. Continuing with this example, as shown in FIG. 4F, the user client device 100/online system 140 may then generate 350 the augmented reality element 410F including information describing the identified recipes 415A-B and the augmented reality element 410F may then be displayed 355. As also shown in FIG. 4F, the augmented reality element 410F also may include a button 420D that allows the user to view more information associated with each recipe 415A-B, and a button 420E that allows the user to select an option to prepare each recipe 415A-B.

In embodiments in which a suggestion associated with preparing the predicted recipe selected 345 by the user client device 100/online system 140 includes information describing how the predicted recipe may be modified, the user client device 100/online system 140 may select 345 the suggestion based on the detected object(s) 405, user data for the user, or any other suitable types of information. For example, suppose that a set of recipe data for the predicted recipe corresponding to a steak recipe includes a steak that is one inch thick as an ingredient and instructions to cook the steak in a skillet on medium-high heat for one minute on each side before baking in the oven and the user client device 100/online system 140 detects a steak that is one and a half inches in thickness. In this example, based on the thickness of the steak detected by the user client device 100/online system 140, the user client device 100/online system 140 may access (e.g., using the suggestion selection module 245) other recipes to which the predicted recipe is connected in the recipe graph that include steaks that are one and a half inches in thickness as an ingredient and use the same technique of cooking in a skillet before baking in the oven. Continuing with this example, the user client device 100/online system 140 may then select 345 a suggestion to cook the steak for slightly longer on each side or at a different temperature based on the instructions in the other recipes. As an additional example, suppose that the user has confirmed they are making a recipe for a salad and that the user client device 100/online system 140 has retrieved 340 a set of user data for the user indicating that the user's favorite cuisine is Italian. In this example, the user client device 100/online system 140 may access (e.g., using the suggestion selection module 245) other recipes to which the recipe is connected in the recipe graph that include ingredients similar to those included in the salad the user is making. In the above example, if some of the recipes are associated with Italian cuisine and include additional ingredients corresponding to one clove of garlic and two tablespoons of basil, and user data for the user indicates that the user likely has these ingredients, the user client device 100/online system 140 may select 345 a suggestion to modify the recipe for the salad by adding the additional ingredients to make it more similar to salads associated with Italian cuisine.

In some embodiments, the augmented reality element 410 generated 350 by the user client device 100/online system 140 includes content to encourage user engagement. Examples of such types of information include: information describing the user's progress with respect to a technique, gamification elements (e.g., badges, points, challenges, etc.), or any other suitable types of content. For example, if user data for the user describes a predicted measure of deviation of an action performed by the user from a technique for chopping onions predicted on various dates, in which the predicted measure of deviation has decreased over the past year, the user client device 100/online system 140 may generate 350 the augmented reality element 410 that includes information describing the user's improvement. In the above example, based on the user's improvement, the user may earn points towards a badge associated with the technique (e.g., a beginner, an intermediate, or an expert onion chopping badge). In the above example, if the user has earned enough points for the badge, the augmented reality element 410 also or alternatively may include information describing a challenge that would allow the user to earn additional points (e.g., trying a more advanced technique for chopping onions).

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated with the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a computer-readable medium, comprising:
   receiving video data captured by a camera of a client device, wherein the video data depicts a field of view of a display area of the client device;
   applying one or more machine-learning algorithms to the video data to detect one or more objects within the field of view of the display area of the client device, the one or more objects comprising one or more portions of a body of a user associated with the client device;
   for each timeframe of a plurality of timeframes of the video data, applying one or more machine-learning algorithms to determine a series of poses of the one or more portions of the body of the user associated with the client device;
   accessing a first machine-learning model trained to predict an action being performed by the user;
   for each timeframe of the plurality of timeframes, applying the first machine-learning model to predict the action being performed by the user based at least in part on the series of poses;
   accessing a second machine-learning model trained to predict a recipe being prepared by the user, wherein the second machine-learning model is trained by:
      receiving recipe data for a plurality of recipes, wherein a set of recipe data for each recipe of the plurality of recipes describes a series of actions and a set of objects associated with preparing a corresponding recipe,
      receiving, for each recipe of the plurality of recipes, a label describing a corresponding recipe, and
      training the second machine-learning model based at least in part on the recipe data and the label for each recipe of the plurality of recipes;
   applying the second machine-learning model to predict the recipe being prepared by the user based at least in part on a predicted series of actions being performed by the user during the plurality of timeframes and the one or more objects;
   retrieving a set of recipe data for the recipe, the set of recipe data comprising a set of candidate suggestions associated with preparing the recipe;
   selecting one or more suggestions associated with preparing the recipe based at least in part on one or more of: the set of candidate suggestions, the one or more objects, or the predicted series of actions;
   generating an augmented reality element comprising information describing the one or more suggestions associated with preparing the recipe; and
   displaying the augmented reality element in the display area of the client device, wherein the augmented reality element is overlaid onto a portion of the display area.

2. The method of claim 1, wherein applying one or more machine-learning algorithms to the video data to detect one or more objects within the field of view of the display area of the client device comprises applying one or more machine-learning algorithms to the video data to detect one or more ingredients of a recipe.

3. The method of claim 1, wherein applying one or more machine-learning algorithms to the video data to detect one or more objects within the field of view of the display area of the client device comprises applying one or more machine-learning algorithms to the video data to detect one or more tools used to prepare a recipe.

4. The method of claim 1, wherein generating the augmented reality element comprising information describing the one or more suggestions associated with preparing the recipe comprises generating the augmented reality element comprising one or more of: a guide for preparing the recipe, information describing a technique associated with preparing the recipe, or information describing an additional recipe.

5. The method of claim 4, wherein generating the augmented reality element comprising the guide for preparing the recipe comprises:
   sending a prompt to the client device to confirm the user is preparing the recipe; and
   responsive to receiving a response to the prompt confirming the user is preparing the recipe, generating the augmented reality element comprising a set of step-by-step instructions for preparing the recipe.

6. The method of claim 5, wherein generating the augmented reality element comprising the set of step-by-step instructions for preparing the recipe comprises:
   responsive to predicting an action associated with a step included in the set of step-by-step instructions has been completed, generating the augmented reality element comprising a video associated with a subsequent step included in the set of step-by-step instructions.

7. The method of claim 4, wherein generating the augmented reality element comprising information describing the technique associated with preparing the recipe comprises:
   accessing an additional machine-learning model trained to predict a measure of deviation of the predicted action being performed by the user from the technique, wherein the additional machine-learning model is trained by:
      receiving action data for a plurality of actions associated with the technique,
      receiving, for each action of the plurality of actions, a label describing the measure of deviation of a corresponding action from the technique, and
      training the additional machine-learning model based at least in part on the action data and the label for each action of the plurality of actions;
   applying the additional machine-learning model to predict the measure of deviation of the predicted action being performed by the user from the technique based at least in part on the video data;

determining that the predicted measure of deviation is at least a threshold measure of deviation; and responsive to determining that the predicted measure of deviation is at least the threshold measure of deviation, generating the augmented reality element comprising a video demonstrating the technique.

8. The method of claim 4, wherein generating the augmented reality element comprising information describing the additional recipe comprises:

identifying the additional recipe based at least in part on the one or more objects;

identifying an additional set of objects associated with the recipe, wherein the additional set of objects is not included among the one or more objects; and generating the augmented reality element comprising one or more of: information describing the additional recipe, information describing the additional set of objects, and a suggestion to place an order including the additional set of objects with an online system.

9. The method of claim 4, wherein generating the augmented reality element comprising information describing the additional recipe comprises:

receiving a request from the user to suggest one or more additional recipes for the user to prepare; and responsive to receiving the request, identifying the additional recipe based at least in part on the one or more objects.

10. The method of claim 1, further comprising:

sending a prompt to the client device to confirm the user is preparing the recipe.

11. A computer program product comprising a non-transitory computer-readable storage medium having instructions encoded thereon that, when executed by a processor, cause the processor to perform steps comprising:

receiving video data captured by a camera of a client device, wherein the video data depicts a field of view of a display area of the client device;

applying one or more machine-learning algorithms to the video data to detect one or more objects within the field of view of the display area of the client device, the one or more objects comprising one or more portions of a body of a user associated with the client device;

for each timeframe of a plurality of timeframes of the video data, applying one or more machine-learning algorithms to determine a series of poses of the one or more portions of the body of the user associated with the client device;

accessing a first machine-learning model trained to predict an action being performed by the user;

for each timeframe of the plurality of timeframes, applying the first machine-learning model to predict the action being performed by the user based at least in part on the series of poses;

accessing a second machine-learning model trained to predict a recipe being prepared by the user, wherein the second machine-learning model is trained by:

receiving recipe data for a plurality of recipes, wherein a set of recipe data for each recipe of the plurality of recipes describes a series of actions and a set of objects associated with preparing a corresponding recipe, receiving, for each recipe of the plurality of recipes, a label describing a corresponding recipe, and training the second machine-learning model based at least in part on the recipe data and the label for each recipe of the plurality of recipes;

applying the second machine-learning model to predict the recipe being prepared by the user based at least in part on a predicted series of actions being performed by the user during the plurality of timeframes and the one or more objects;

retrieving a set of recipe data for the recipe, the set of recipe data comprising a set of candidate suggestions associated with preparing the recipe;

selecting one or more suggestions associated with preparing the recipe based at least in part on one or more of: the set of candidate suggestions, the one or more objects, or the predicted series of actions;

generating an augmented reality element comprising information describing the one or more suggestions associated with preparing the recipe; and displaying the augmented reality element in the display area of the client device, wherein the augmented reality element is overlaid onto a portion of the display area.

12. The computer program product of claim 11, wherein applying one or more machine-learning algorithms to the video data to detect one or more objects within the field of view of the display area of the client device comprises applying one or more machine-learning algorithms to the video data to detect one or more ingredients of a recipe.

13. The computer program product of claim 11, wherein applying one or more machine-learning algorithms to the video data to detect one or more objects within the field of view of the display area of the client device comprises applying one or more machine-learning algorithms to the video data to detect one or more tools used to prepare a recipe.

14. The computer program product of claim 11, wherein generating the augmented reality element comprising information describing the one or more suggestions associated with preparing the recipe comprises generating the augmented reality element comprising one or more of: a guide for preparing the recipe, information describing a technique associated with preparing the recipe, or information describing an additional recipe.

15. The computer program product of claim 14, wherein generating the augmented reality element comprising the guide for preparing the recipe comprises:

sending a prompt to the client device to confirm the user is preparing the recipe; and responsive to receiving a response to the prompt confirming the user is preparing the recipe, generating the augmented reality element comprising a set of step-by-step instructions for preparing the recipe.

16. The computer program product of claim 15, wherein generating the augmented reality element comprising the set of step-by-step instructions for preparing the recipe comprises:

responsive to predicting an action associated with a step included in the set of step-by-step instructions has been completed, generating the augmented reality element comprising a video associated with a subsequent step included in the set of step-by-step instructions.

17. The computer program product of claim 14, wherein generating the augmented reality element comprising information describing the technique associated with preparing the recipe comprises:

accessing an additional machine-learning model trained to predict a measure of deviation of the predicted action being performed by the user from the technique, wherein the additional machine-learning model is trained by:

receiving action data for a plurality of actions associ-
ated with the technique,
receiving, for each action of the plurality of actions, a
label describing the measure of deviation of a cor-
responding action from the technique, and
training the additional machine-learning model based
at least in part on the action data and the label for
each action of the plurality of actions;
applying the additional machine-learning model to predict
the measure of deviation of the predicted action being
performed by the user from the technique based at least
in part on the video data;
determining that the predicted measure of deviation is at
least a threshold measure of deviation; and
responsive to determining that the predicted measure of
deviation is at least the threshold measure of deviation,
generating the augmented reality element comprising a
video demonstrating the technique.

18. The computer program product of claim 14, wherein
generating the augmented reality element comprising infor-
mation describing the additional recipe comprises:
identifying the additional recipe based at least in part on
the one or more objects;
identifying an additional set of objects associated with the
recipe, wherein the additional set of objects is not
included among the one or more objects; and
generating the augmented reality element comprising one
or more of: information describing the additional
recipe, information describing the additional set of
objects, and a suggestion to place an order including the
additional set of objects with an online system.

19. The computer program product of claim 14, wherein
generating the augmented reality element comprising infor-
mation describing the additional recipe comprises:
receiving a request from the user to suggest one or more
additional recipes for the user to prepare; and
responsive to receiving the request, identifying the addi-
tional recipe based at least in part on the one or more
objects.

20. A computer system comprising:
a processor; and
a non-transitory computer-readable storage medium stor-
ing instructions that, when executed by the processor,
perform actions comprising:
receiving video data captured by a camera of a client
device, wherein the video data depicts a field of view
of a display area of the client device;
applying one or more machine-learning algorithms to
the video data to detect one or more objects within
the field of view of the display area of the client device, the one or more objects comprising one or
more portions of a body of a user associated with the
client device;
for each timeframe of a plurality of timeframes of the
video data, applying one or more machine-learning
algorithms to determine a series of poses of the one
or more portions of the body of the user associated
with the client device;
accessing a first machine-learning model trained to
predict an action being performed by the user;
for each timeframe of the plurality of timeframes,
applying the first machine-learning model to predict
the action being performed by the user based at least
in part on the series of poses;
accessing a second machine-learning model trained to
predict a recipe being prepared by the user, wherein
the second machine-learning model is trained by:
receiving recipe data for a plurality of recipes,
wherein a set of recipe data for each recipe of the
plurality of recipes describes a series of actions
and a set of objects associated with preparing a
corresponding recipe,
receiving, for each recipe of the plurality of recipes,
a label describing a corresponding recipe, and
training the second machine-learning model based at
least in part on the recipe data and the label for
each recipe of the plurality of recipes;
applying the second machine-learning model to predict
the recipe being prepared by the user based at least
in part on a predicted series of actions being per-
formed by the user during the plurality of timeframes
and the one or more objects;
retrieving a set of recipe data for the recipe, the set of
recipe data comprising a set of candidate suggestions
associated with preparing the recipe;
selecting one or more suggestions associated with
preparing the recipe based at least in part on one or
more of: the set of candidate suggestions, the one or
more objects, or the predicted series of actions;
generating an augmented reality element comprising
information describing the one or more suggestions
associated with preparing the recipe; and
displaying the augmented reality element in the display
area of the client device, wherein the augmented
reality element is overlaid onto a portion of the
display area.

* * * * *